US008823647B2

(12) United States Patent
Tarama et al.

(10) Patent No.: US 8,823,647 B2
(45) Date of Patent: Sep. 2, 2014

(54) MOVEMENT CONTROL DEVICE, CONTROL METHOD FOR A MOVEMENT CONTROL DEVICE, AND NON-TRANSITORY INFORMATION STORAGE MEDIUM

(75) Inventors: Naoki Tarama, Suita (JP); Tatsuto Yabe, Yokohama (JP); Takenobu Fujishima, Kawasaki (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 175 days.

(21) Appl. No.: 13/614,643

(22) Filed: Sep. 13, 2012

(65) Prior Publication Data

US 2013/0194175 A1  Aug. 1, 2013

(30) Foreign Application Priority Data

Jan. 31, 2012  (JP) ................................ 2012-017919

(51) Int. Cl.
*G06F 3/033* (2013.01)
*G06F 17/24* (2006.01)
*G06F 17/00* (2006.01)

(52) U.S. Cl.
USPC ............. 345/158; 345/156; 345/157; 463/36; 715/863

(58) Field of Classification Search
CPC ....... G06F 3/017; G06F 3/0346; G06F 3/011; G06F 3/038; G08C 2201/32; G08C 2201/91
USPC .............. 345/156, 157, 158; 463/36; 715/863
See application file for complete search history.

(56) References Cited

U.S. PATENT DOCUMENTS

| 2001/0042245 | A1 | 11/2001 | Iwamura | |
|---|---|---|---|---|
| 2009/0103780 | A1* | 4/2009 | Nishihara et al. | 345/156 |
| 2009/0228841 | A1 | 9/2009 | Hildreth | |
| 2011/0289455 | A1* | 11/2011 | Reville et al. | 715/863 |
| 2012/0026083 | A1* | 2/2012 | Okada | 345/156 |
| 2012/0313848 | A1* | 12/2012 | Galor et al. | 345/156 |

FOREIGN PATENT DOCUMENTS

| JP | 2000-196914 A | 7/2000 |
|---|---|---|
| JP | 2002-213989 A | 7/2002 |
| JP | 2011-517357 A | 6/2011 |
| JP | 2011-177579 A | 9/2011 |

OTHER PUBLICATIONS

Office Action issued in corresponding Japanese Patent Application No. 2012-017919 dated Dec. 17, 2014.
http://support.xbox.com/en-US/kinect/body-tracking/body-controller.

* cited by examiner

*Primary Examiner* — Kevin M Nguyen
(74) *Attorney, Agent, or Firm* — Sughrue Mion, PLLC

(57) ABSTRACT

A movement restriction unit restricts a movement of a movement subject within a display screen or a virtual space in a case where a numerical value indicating a magnitude of a displacement between a position of a hand or the like of a user and a reference position or a reference direction is smaller than the first reference value. A first movement control unit moves the movement subject at a first speed in a case where the above-mentioned numerical value is equal to or larger than the first reference value and smaller than a second reference value that is larger than the first reference value. A second movement control unit moves the movement subject at a second speed that is faster than the first speed in a case where the above-mentioned numerical value is equal to or larger than the second reference value.

15 Claims, 14 Drawing Sheets

FIG.5

| BODY PART | THREE-DIMENSIONAL COORDINATES |
|---|---|
| HEAD | $P1(X_{P1}, Y_{P1}, Z_{P1})$ |
| CENTER OF SHOULDERS | $P2(X_{P2}, Y_{P2}, Z_{P2})$ |
| LEFT SHOULDER | $P3(X_{P3}, Y_{P3}, Z_{P3})$ |
| RIGHT SHOULDER | $P4(X_{P4}, Y_{P4}, Z_{P4})$ |
| LEFT HAND | $P5(X_{P5}, Y_{P5}, Z_{P5})$ |
| RIGHT HAND | $P6(X_{P6}, Y_{P6}, Z_{P6})$ |
| BACK | $P7(X_{P7}, Y_{P7}, Z_{P7})$ |
| LEFT KNEE | $P8(X_{P8}, Y_{P8}, Z_{P8})$ |
| RIGHT KNEE | $P9(X_{P9}, Y_{P9}, Z_{P9})$ |
| LEFT FOOT | $P10(X_{P10}, Y_{P10}, Z_{P10})$ |
| RIGHT FOOT | $P11(X_{P11}, Y_{P11}, Z_{P11})$ |
| ⋮ | ⋮ |

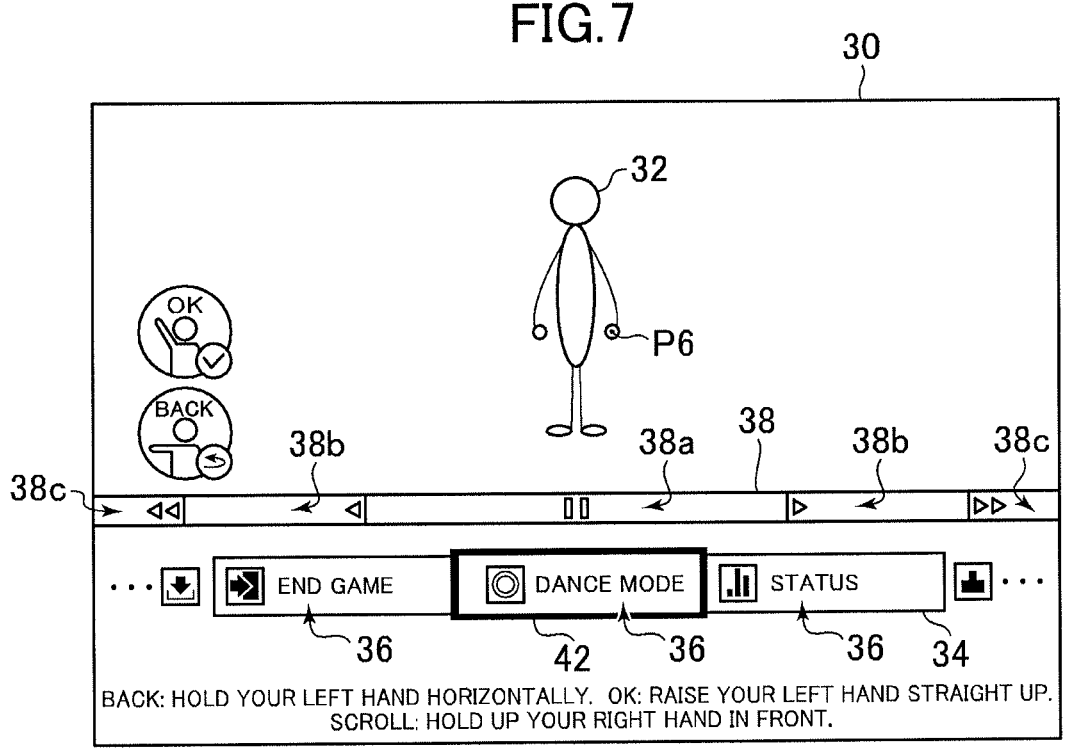
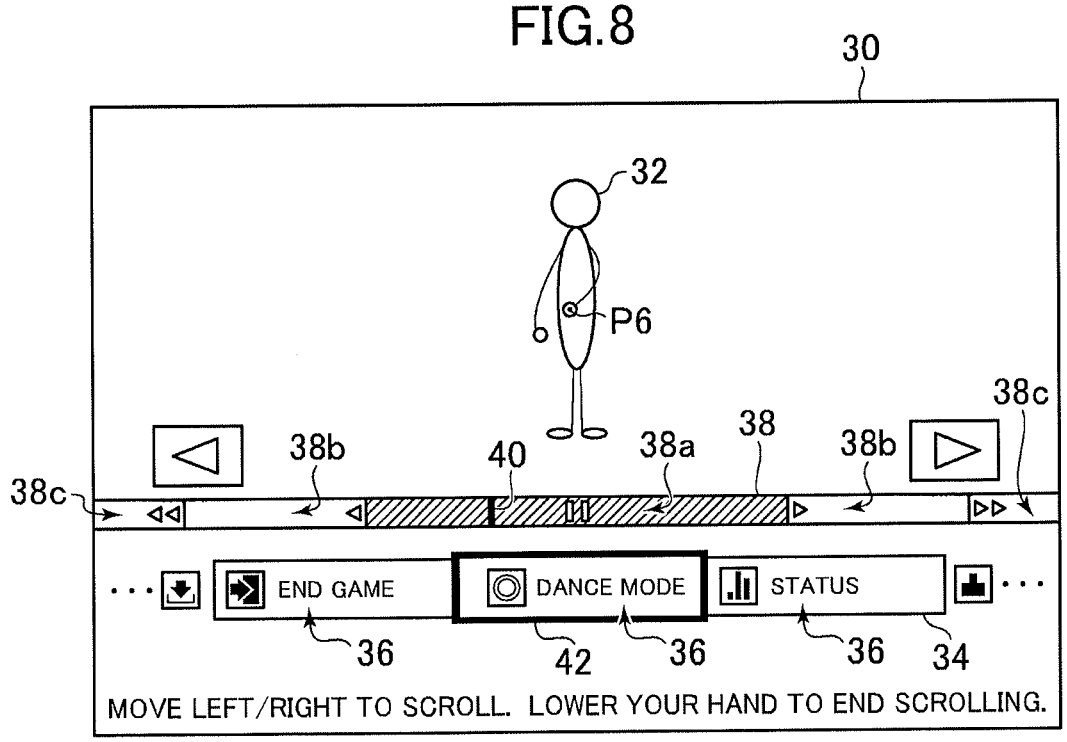

MOVEMENT CONTROL DEVICE, CONTROL METHOD FOR A MOVEMENT CONTROL DEVICE, AND NON-TRANSITORY INFORMATION STORAGE MEDIUM

CROSS-REFERENCE TO RELATED APPLICATION

The present application claims priority from Japanese application JP 2012-017919 filed on Jan. 31, 2012, the content of which is hereby incorporated by reference into this application.

BACKGROUND OF THE INVENTION

1. Field of the Invention

The present invention relates to a movement control device, a control method for a movement control device, and a non-transitory information storage medium.

2. Description of the Related Art

Up to now, there is known a technology relating to a movement control device for moving a movement subject (image, character, or the like) within a display screen or a virtual space. For example, there is known a technology for detecting a position of a user's hand in a real space and scrolling menu items one by one each time the user waves their hand in a horizontal direction.

SUMMARY OF THE INVENTION

However, with such a technology as described above, a user finds it cumbersome to need to wave their hand the same number of times as the number of menu items to scroll.

The present invention has been made in view of the above-mentioned problem, and an object thereof is to provide a movement control device, a control method for a movement control device, and a program, which allow a movement subject to move within a display screen or a virtual space without having a user feel that operation is cumbersome.

In order to solve the above-mentioned problem, according to an exemplary embodiment of the present invention, there is provided a movement control device, which moves a movement subject within one of a display screen and a virtual space, including: position information acquiring means for acquiring position information relating to one of: a position within a real space of one of a user's hand and a grasped object grasped by the user; and a position within one of the display screen and the virtual space corresponding to the position within the real space of the one of the user's hand and the grasped object grasped by the user; and movement control means for performing movement control on the movement subject based on the position information, in which the movement control means includes: movement restriction means for restricting a movement of the movement subject in a case where a numerical value indicating a magnitude of a displacement between a position indicated by the position information and one of a reference position and a reference direction is smaller than a first reference value; first movement control means for moving the movement subject at a first speed toward one of a direction defined based on the position information and a predetermined direction in a case where the numerical value is equal to or larger than the first reference value and smaller than a second reference value that is larger than the first reference value; and second movement control means for moving the movement subject at a second speed that is faster than the first speed in the one of the direction defined based on the position information and the predetermined direction in a case where the numerical value is equal to or larger than the second reference value.

According to an exemplary embodiment of the present invention, there is also provided a control method for a movement control device, which moves a movement subject within one of a display screen and a virtual space, the control method including: acquiring position information relating to one of: a position within a real space of one of a user's hand and a grasped object grasped by the user; and a position within one of the display screen and the virtual space corresponding to the position within the real space of the one of the user's hand and the grasped object grasped by the user; and performing movement control on the movement subject based on the position information, in which the performing of movement control includes: a movement restriction step of restricting a movement of the movement subject in a case where a numerical value indicating a magnitude of a displacement between a position indicated by the position information and one of a reference position and a reference direction is smaller than a first reference value; a first movement control step of moving the movement subject at a first speed in one of a direction defined based on the position information and a predetermined direction in a case where the numerical value is equal to or larger than the first reference value and smaller than a second reference value that is larger than the first reference value; and a second movement control step of moving the movement subject at a second speed that is faster than the first speed in the one of the direction defined based on the position information and the predetermined direction in a case where the numerical value is equal to or larger than the second reference value.

According to an exemplary embodiment of the present invention, there is further provided a program for causing a computer to function as a movement control device, which moves a movement subject within one of a display screen and a virtual space, the program further causing the computer to function as: position information acquiring means for acquiring position information relating to one of: a position within a real space of one of a user's hand and a grasped object grasped by the user; and a position within one of the display screen and the virtual space corresponding to the position within the real space of the one of the user's hand and the grasped object grasped by the user; and movement control means for performing movement control on the movement subject based on the position information, in which the movement control means includes: movement restriction means for restricting a movement of the movement subject in a case where a numerical value indicating a magnitude of a displacement between a position indicated by the position information and one of a reference position and a reference direction is smaller than a first reference value; first movement control means for moving the movement subject at a first speed in one of a direction defined based on the position information and a predetermined direction in a case where the numerical value is equal to or larger than the first reference value and smaller than a second reference value that is larger than the first reference value; and second movement control means for moving the movement subject at a second speed that is faster than the first speed in the one of the direction defined based on the position information and the predetermined direction in a case where the numerical value is equal to or larger than the second reference value.

According to an exemplary embodiment the present invention, there is further provided a computer-readable non-transitory information storage medium having the above-mentioned program recorded thereon.

According to the exemplary embodiments of the present invention, it is possible to allow the movement subject to move within the display screen or the virtual space without having the user feel that an operation is cumbersome.

Further, according to the exemplary embodiment of the present invention, the movement control device according to claim 1, in which: the movement subject moves in a predetermined moving direction within the one of the display screen and the virtual space; the movement control device further includes: means for displaying a first image that extends in a direction corresponding to the predetermined moving direction and a second image that moves on the first image in an extending direction of the first image on the display screen; and second-image control means for moving the second image on the first image so that a positional relation between a representative point of the first image and a display position of the second image corresponds to a positional relation between the position indicated by the position information and the one of the reference position and the reference direction; the first image includes: a first region that has a length corresponding to the first reference value and includes the representative point; a second region that has a length corresponding to a difference between the second reference value and the first reference value and is adjacent to the first region; and a third region that has a predetermined length and is adjacent to a side opposite to a side on which the second region is adjacent to the first region; and the second-image control means is configured to: move the second image on the first region in a case where restriction is performed by the movement restriction means; move the second image move on the second region in a case where control is performed by the first movement control means; and move the second image on the third region in a case where control is performed by the second movement control means.

Further, according to the exemplary embodiment of the present invention, the movement restriction means includes: means for restricting the movement of the movement subject in a case where the position indicated by the position information falls on a forward direction side corresponding to the user's hand of the one of the reference position and the reference direction with the numerical value being smaller than a first forward direction reference value; and means for restricting the movement of the movement subject in a case where the position indicated by the position information falls on a backward direction side opposite to the forward direction side of the one of the reference position and the reference direction with the numerical value being smaller than a first backward direction reference value that is smaller than the first forward direction reference value; the first movement control means includes: means for moving the movement subject at the first speed in a case where the position indicated by the position information falls on the forward direction side of the one of the reference position and the reference direction with the numerical value being equal to or larger than the first forward direction reference value and being smaller than a second forward direction reference value that is larger than the first forward direction reference value; and means for moving the movement subject at the first speed in a case where the position indicated by the position information falls on the backward direction side of the one of the reference position and the reference direction with the numerical value being equal to or larger than the first backward direction reference value and being smaller than a second backward direction reference value that is smaller than the second forward direction reference value; and the second movement control means includes: means for moving the movement subject at the second speed in a case where the position indicated by the position information falls on the forward direction side of the one of the reference position and the reference direction with the numerical value being equal to or larger than the second forward direction reference value; and means for moving the movement subject at the second speed in a case where the position indicated by the position information falls on the backward direction side of the one of the reference position and the reference direction with the numerical value being equal to or larger than the second backward direction reference value.

Further, according to the exemplary embodiment of the present invention, the movement control device further includes: means for acquiring information relating to a size of a body of the user; and means for changing the first reference value and the second reference value based on the information relating to the size of the body of the user.

Further, according to the exemplary embodiment of the present invention, the movement control device further includes: means for restricting the movement control performed by the movement control means; means for determining whether or not the user has held out their hand based on information relating to the position within the real space of the one of the user's hand and the grasped object grasped by the user; and means for lifting restriction of the movement control performed by the movement control means in a case where it is determined that the user has held out their hand.

Further, according to the exemplary embodiment of the present invention, the movement control device further includes: means for determining whether or not the user has lowered their hand based on information relating to the position within the real space of the one of the user's hand and the grasped object grasped by the user in a state in which the movement control is being performed by the movement control means; and means for restricting the movement control performed by the movement control means in a case where it is determined that the user has lowered their hand.

Further, according to the exemplary embodiment of the present invention, the position information is information relating to one of: a position within the real space of one of a first hand of the user and the grasped object grasped by the user by the first hand; and the position within the one of the display screen and the virtual space corresponding to the position within the real space of the one of the first hand of the user and the grasped object grasped by the user by the first hand; the movement subject is a plurality of item images respectively indicating a plurality of menu items; the movement control means moves the plurality of item images within the display screen; and the movement control device further includes: means for acquiring information relating to a position within the real space of one of a second hand of the user and the grasped object grasped by the user by the second hand; means for determining whether or not the one of the second hand of the user and the grasped object grasped by the second hand has performed a given action; and means for executing processing corresponding to a corresponding one of the plurality of menu items of a corresponding one of the plurality of item images displayed in a predetermined position on the display screen in a case where it is determined that the one of the second hand of the user and the grasped object grasped by the second hand has performed the given action.

Further, according to the exemplary embodiment of the present invention, the position information is information relating to one of: a position within the real space of one of a first hand of the user and the grasped object grasped by the user by the first hand; and the position within the one of the display screen and the virtual space corresponding to the position within the real space of the one of the first hand of the user and the grasped object grasped by the user by the first hand; the movement subject is a cursor image that moves on a plurality of item images respectively indicating a plurality of menu items; the movement control means moves the cursor image on the plurality of item images displayed on the display screen; and the movement control device further includes: means for acquiring information relating to a position within the real space of one of a second hand of the user and the grasped object grasped by the user by the second hand; means for determining whether or not the one of the second hand of the user and the grasped object grasped by the second hand has performed a given action; and means for executing processing corresponding to a corresponding one of the plurality of menu items of a corresponding one of the plurality of item images indicated by the cursor image in a case where it is determined that the one of the second hand of the user and the grasped object grasped by the second hand has performed the given action.

Further, according to the exemplary embodiment of the present invention, the position information is information relating to the position within the real space of the one of the user's hand and the grasped object grasped by the user; the numerical value is an angle between a direction from a user reference position relating to a position of the body of the user toward the position indicated by the position information and the reference direction which is set in the real space; the movement restriction means restricts the movement of the movement subject in a case where the angle is smaller than a first reference angle; the first movement control means moves the movement subject at the first speed in a case where the angle is equal to or larger than the first reference angle and smaller than a second reference angle that is larger than the first reference angle; and the second movement control means moves the movement subject at the second speed in a case where the angle is equal to or larger than the second reference angle.

Further, according to the exemplary embodiment of the present invention, the position information is information relating to the position within the real space of the one of the user's hand and the grasped object grasped by the user; the numerical value is a distance between the position indicated by the position information and the reference position which is set in the real space; the movement restriction means restricts the movement of the movement subject in a case where the distance is smaller than a first reference distance; the first movement control means moves the movement subject at the first speed in a case where the distance is equal to or larger than the first reference distance and smaller than a second reference distance that is larger than the first reference distance; and the second movement control means moves the movement subject at the second speed in a case where the distance is equal to or larger than the second the reference distance.

Further, according to the exemplary embodiment of the present invention, the position information is information relating to the position within the one of the display screen and the virtual space corresponding to the position within the real space of the one of the user's hand and the grasped object grasped by the user; the numerical value is a distance between the position indicated by the position information and the reference position which is set in the one of the display screen and the virtual space; the movement restriction means restricts the movement of the movement subject in a case where the distance is equal to or larger than a first reference distance; the first movement control means moves the movement subject at the first speed in a case where the distance is equal to or larger than the first reference distance and smaller than a second reference distance that is larger than the first reference distance; and the second movement control means moves the movement subject at the second speed in a case where the distance is equal to or larger than the second the reference distance.

Further, according to the exemplary embodiment of the present invention, the movement subject is a display subject region which is set within the virtual space; the display screen has a state of an inside of the display subject region within the virtual space displayed thereon; the movement restriction means restricts a movement of the display subject region in a case where the numerical value is smaller than the first reference value; the first movement control means moves the display subject region at the first speed in a case where the numerical value is equal to or larger than the first reference value and smaller than the second reference value; and the second movement control means moves the display subject region at the second speed in a case where the numerical value is equal to or larger than the second reference value.

Further, according to the exemplary embodiment of the present invention, the movement subject is one of an image that moves within the display screen and an operation subject of the user which moves within the virtual space; the movement restriction means restricts a movement of the one of the image and the operation subject in a case where the numerical value is smaller than the first reference value; the first movement control means moves the one of the image and the operation subject at the first speed in a case where the numerical value is equal to or larger than the first reference value and smaller than the second reference value; and the second movement control means moves the one of the image and the operation subject at the second speed in a case where the numerical value is equal to or larger than the second reference value.

BRIEF DESCRIPTION OF THE DRAWINGS

In the accompanying drawings:

FIG. 5 is a diagram illustrating an example of user body part information generated by a position detecting device;

FIG. 7 is a diagram illustrating an example of a menu screen;

FIG. 8 is a diagram illustrating an example of the menu screen in a case where the user holds out their right hand in front;

DETAILED DESCRIPTION OF THE INVENTION (1. Embodiment)

Hereinafter, detailed description is given of an example of an embodiment of the present invention with reference to the accompanying drawings. A movement control device according to the embodiment of the present invention is implemented by a computer such as a game device or a personal computer. In the following, the description is directed to a case where the movement control device according to the embodiment of the present invention is implemented by the game device. Note that a consumer game machine (stationary game machine) is taken as an example of the game device, but the game device may be a portable game machine, a mobile phone (smartphone), or the like.

Figure 1:
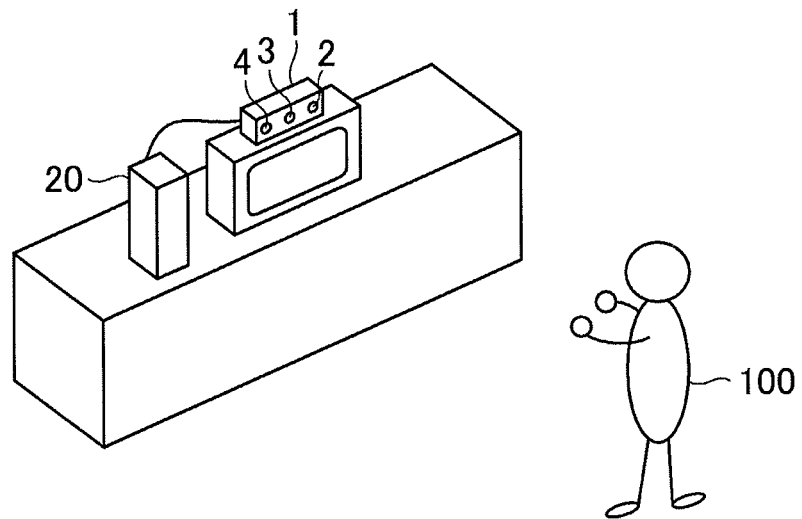
FIG. 1 is a diagram illustrating how a user plays a game.

FIG. 1 is a diagram illustrating how a user plays a game. As illustrated in FIG. 1, a user 100 is positioned, for example, in front of a position detecting device 1. The position detecting device 1 and a game device 20 are connected to each other so as to be able to communicate data therebetween.

(2. Operation of Position Detecting Device)

First, the position detecting device 1 is described. The position detecting device 1 generates user body part information relating to a position of the user in a real space. In this embodiment, description is given of a case where the user body part information includes information relating to positions of a plurality of body parts of the user 100. The body parts of the user 100 include, for example, a head and both arms.

As illustrated in FIG. 1, the position detecting device 1 includes, for example, a CCD camera 2, an infrared sensor 3, and a microphone 4 including a plurality of microphones.

The CCD camera 2 is a known camera including a CCD image sensor. For example, the CCD camera 2 generates a photographed image (for example, RGB digital image) by photographing the user 100 at predetermined time intervals (for example, every 1/60th of a second).

Figure 2:
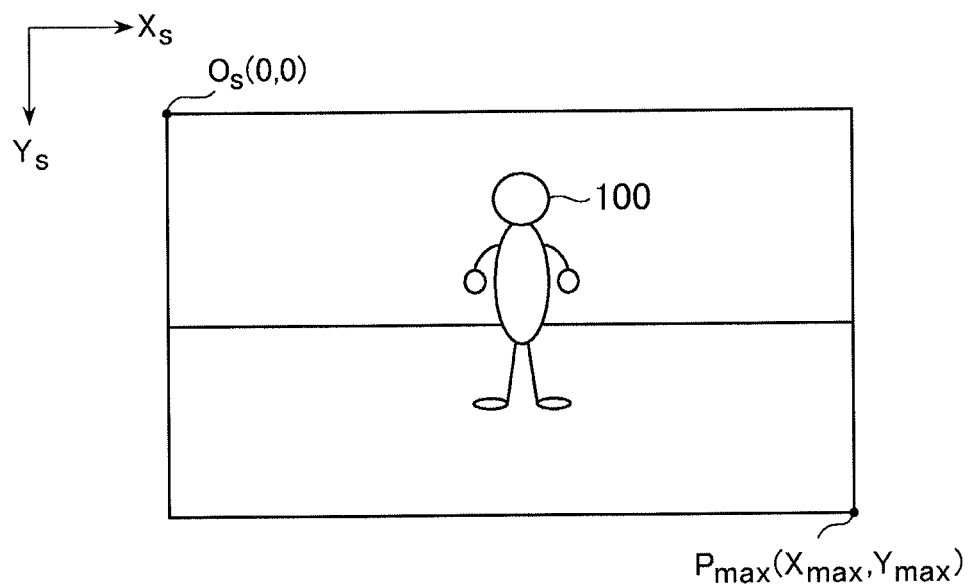
FIG. 2 is a diagram illustrating an example of a photographed image generated by a CCD camera.

FIG. 2 is a diagram illustrating an example of the photographed image generated by the CCD camera 2. As illustrated in FIG. 2, the photographed image includes, for example, the user 100. In the photographed image, there are set an Xs-axis and a Ys-axis, which are orthogonal to each other. For example, the upper left corner of the photographed image is set as an origin Os (0,0). Further, for example, the lower right corner of the photographed image is set as coordinates Pmax (Xmax,Ymax). The position of each pixel in the photographed image is identified by two-dimensional coordinates (Xs-Ys coordinates) that are assigned to each pixel.

The infrared sensor 3 is formed of, for example, an infrared emitting device and an infrared receiving device (for example, infrared diodes). The infrared sensor 3 detects reflected light obtained by emitting infrared light. The infrared sensor 3 measures the depth of a subject (for example, user 100) based on a detection result of the reflected light.

The depth of a subject is a distance between a measurement reference position and the position of the subject. The measurement reference position is a position that serves as a reference in measuring the depth (perspective) of the position of the user 100. The measurement reference position may be a predetermined position associated with the position of the position detecting device 1, such as the position of the infrared receiving device of the infrared sensor 3. The infrared sensor 3 measures the depth of the user 100 based, for example, on a time of flight (TOF), which is a time required for the infrared sensor 3 to receive reflected light after emitting infrared light.

Figure 3:
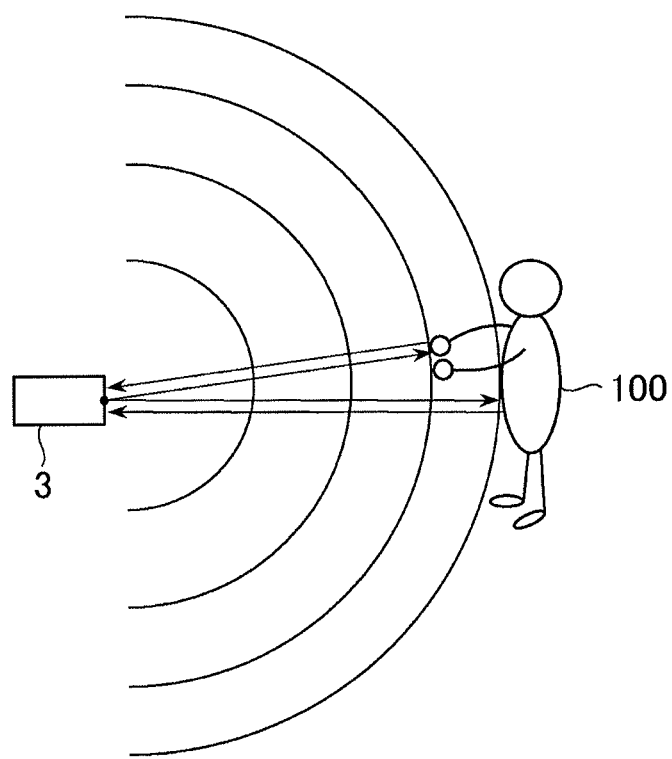
FIG. 3 is a diagram illustrating a method of measuring a depth of a user, which is performed by an infrared sensor.

FIG. 3 is a diagram for describing a method of measuring the depth of the user 100, which is performed by the infrared sensor 3. As illustrated in FIG. 3, the infrared sensor 3 emits pulsed infrared light at predetermined intervals. The infrared light emitted from the infrared sensor 3 spreads spherically with an emission position of the infrared sensor 3 at the center.

The infrared light emitted from the infrared sensor 3 strikes, for example, surfaces of the body of the user 100. The infrared light that has struck those surfaces is reflected. The reflected infrared light is detected by the infrared receiving device of the infrared sensor 3. Specifically, the infrared sensor 3 detects reflected light having a phase shifted by 180° from that of the emitted infrared light.

For example, as illustrated in FIG. 3, in a case where the user 100 is holding out both hands, those held-out hands are closer to the infrared sensor 3 than the torso of the user 100. Specifically, the TOF of the infrared light reflected by both hands of the user 100 is shorter than the TOF of the infrared light reflected by the torso of the user 100.

The value determined as follows corresponds to the distance between the measurement reference position and the user 100 (that is, depth). Specifically, the value is determined by multiplying a time required for the infrared sensor 3 to detect the reflected light after emitting the infrared light (that is, TOF) by the speed of the infrared light and then dividing the resultant value by two. In this manner, the infrared sensor 3 can measure the depth of the user 100.

Further, the infrared sensor 3 also detects an outline of a subject (user 100) by detecting depth differences acquired from the reflected infrared light. The fact that the infrared sensor 3 receives the reflected infrared light as described above means that an object is located at that place. Further, if there is no other object located behind the object in vicinity, the depth difference between the object and the surroundings of the object is large. For example, the infrared sensor 3 detects the outline of the user 100 by joining portions having the depth differences larger than a predetermined value.

Note that the method of detecting the outline of the user 100 is not limited to the above-mentioned example. Alternatively, for example, the outline may be detected based on the brightness of each pixel of the photographed image acquired by the CCD camera 2. In this case, it is equally possible to detect the outline of the user 100 by, for example, joining portions having large brightness differences among the pixels.

Information relating to the depth of the user 100 (depth information), which is detected as described above, is expressed as, for example, a depth image. In this embodiment, description is given by taking, as an example, a case where the depth information is expressed as a gray-scale depth image (for example, 256-bit gray-scale image data).

Figure 4:
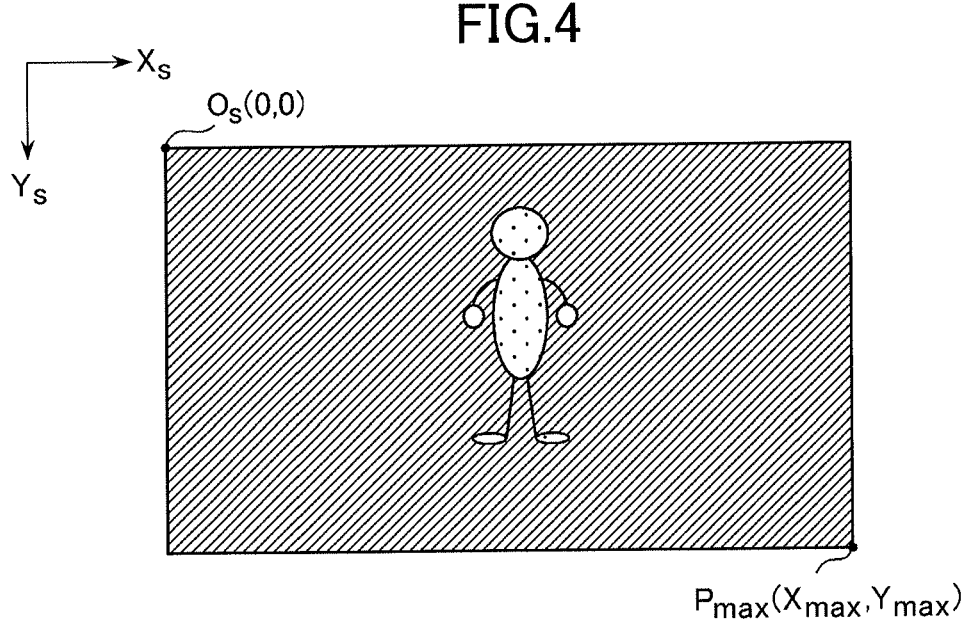
FIG. 4 is a diagram illustrating an example of a depth image obtained by the infrared sensor.

FIG. 4 is a diagram illustrating an example of the depth image acquired by the infrared sensor 3. As illustrated in FIG. 4, for example, an object located close to the infrared sensor 3 is expressed as bright (brightness is high), and an object located far from the infrared sensor 3 is expressed as dark (brightness is low). The depth of the user 100 corresponds to the brightness (pixel value) of the depth image.

For example, in a case where the depth image is expressed as the 256-bit gray-scale image data, for every 2-cm change in depth of the user 100, the depth image is changed in brightness by one bit. This case means that the infrared sensor 3 is capable of detecting the depth of the subject in units of 2 cm. In the case where the user 100 is holding out both hands forward (FIG. 3), as illustrated in FIG. 4, pixels corresponding to both hands of the user 100 are expressed as brighter (brightness is higher) than pixels corresponding to the torso.

In this embodiment, similarly to the CCD camera 2, the infrared sensor 3 generates the depth image at predetermined time intervals (for example, every ¹⁄₆₀th of a second). Based on the photographed image acquired by the CCD camera 2 and the depth image acquired by the infrared sensor 3, the user body part information is generated relating to the positions of body parts of the user 100.

For example, there is generated such a composite image (RGBD data) that is obtained by adding the depth information (D: depth) indicated by the depth image to the photographed image (RGB data) acquired by the CCD camera 2. In other words, the composite image contains, for each pixel, color information (lightness of each of R, G, and B) and the depth information.

In a case where user body part information is generated based on the composite image, first, based on the depth image, pixels corresponding to the outline of the user 100 are identified. Next, in the composite image, the color information (lightness of R, G, and B) of pixels enclosed within the outline is referred to. Based on the color information of the composite image, pixels corresponding to each part of the body of the user 100 are identified. For this identification method, for example, a known method is applicable, such as a pattern matching method in which the object (that is, each part of the body of the user 100) is extracted from the image through a comparison with a comparison image (training image).

Based on the pixel values (RGBD values) of the pixels identified as described above, sets of the three-dimensional coordinates of the head, shoulders, etc. of the user 100 are calculated. For example, the three-dimensional coordinates are generated by carrying out predetermined matrix transformation processing on those pixel values. The matrix transformation processing is executed through, for example, a matrix operation similar to transformation processing performed in 3D graphics between two coordinate systems of a world coordinate system and a screen coordinate system. Specifically, the RGB value indicating the color information of the pixel and the D value indicating the perspective are substituted into a predetermined determinant, to thereby calculate the three-dimensional coordinate of the pixel.

Note that for the method of calculating the three-dimensional coordinate that corresponds to a pixel based on the pixel value (RGBD value), a known method may be applied, and the calculation method is not limited to the above-mentioned example. Alternatively, for example, the coordinate transformation may be performed through the use of a lookup table.

FIG. 5 is a diagram illustrating an example of the user body part information generated by the position detecting device 1. As illustrated in FIG. 5, the user body part information includes a plurality of pieces of information relating to positions of a plurality of body parts of the user 100. As the user body part information, for example, each part of the user 100 and the three-dimensional coordinates are stored in association with each other.

Figure 6:
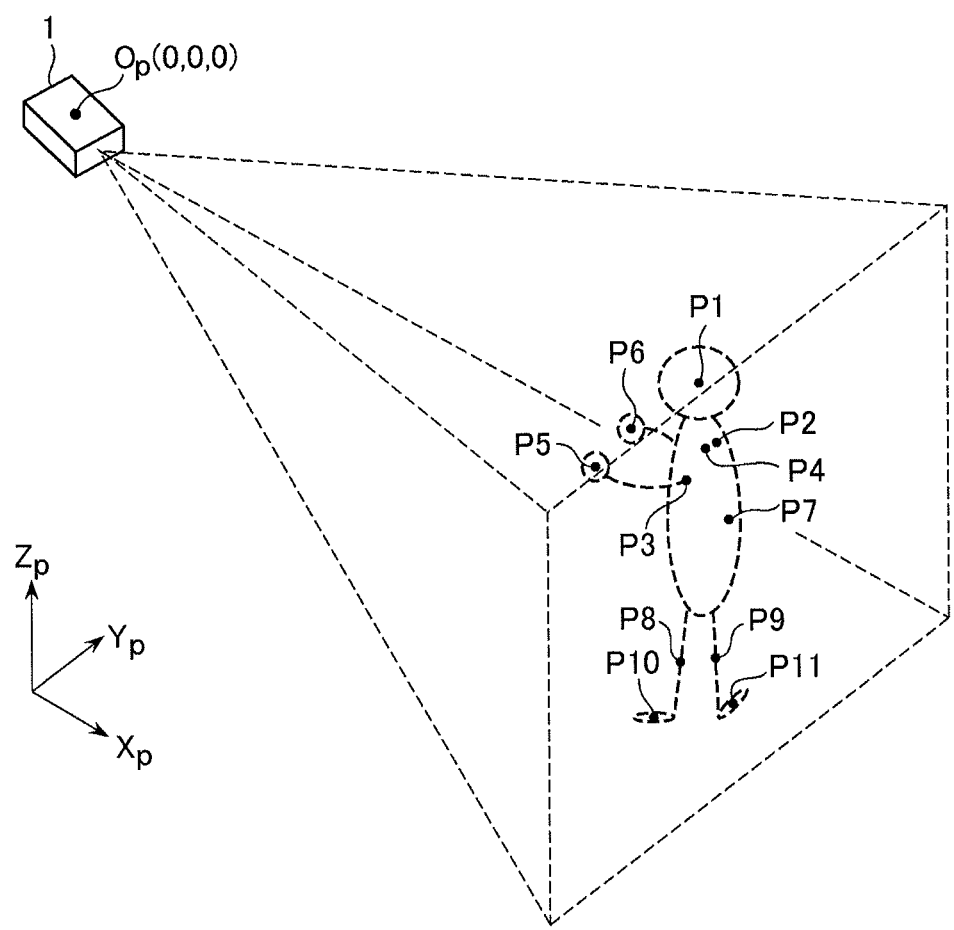
FIG. 6 is a diagram illustrating a position of the user, which is identified by the user body part information.

FIG. 6 is a diagram illustrating the position of the user 100, which is identified by the user body part information. In this embodiment, for example, a predetermined position corresponding to the position detecting device 1 (for example, the measurement reference position) is set as an origin Op. For example, the origin Op represents the three-dimensional coordinates corresponding to the measurement reference position of the infrared sensor 3. Note that the position of the origin Op may be set anywhere in the three-dimensional space in which the user 100 exists. For example, the three-dimensional coordinates corresponding to the origin Os of the photographed image may be set as the origin Op.

As illustrated in FIG. 6, for example, the user body part information includes eleven sets of three-dimensional coordinates corresponding to a head P1, center of shoulders P2, left shoulder P3, right shoulder P4, left hand P5, right hand P6, back P7, left knee P8, right knee P9, left foot P10, and right foot P11 of the user 100.

Note that the part of the body of the user 100, which is indicated by the user body part information, may be a part that is determined in advance from the user's body (skeletal frame). For example, any part of the body may be used as long as the part is identifiable by the above-mentioned pattern matching method.

For example, the user body part information generated every predetermined time interval (for example, every ¹⁄₆₀th of a second) is transmitted from the position detecting device 1 to the game device 20. The game device 20 receives the user body part information from the position detecting device 1, to thereby identify the positions of respective body parts of the user (hereinafter, reference numeral "100" of the user is omitted) and then executes various kinds of processing based on a movement of the body parts of the user.

(3. Summary of Processing Executed on the Game Device)

The game device 20 moves a movement subject within a display screen or a virtual space. For example, the movement subject moves in a predetermined moving direction within the display screen or the virtual space. The display screen represents an inside of a display region of the display unit. The virtual space represents a two-dimensional or three-dimensional space that is developed in a memory and displayed on the display screen.

For example, an image displayed on the display screen, a character located in the virtual space, or the like corresponds to the movement subject. That is, the movement subject moves based on a change in the display position of the image or a standing position of the character within the virtual space. In this embodiment, the description is directed to a case where the game device 20 moves the image by performing processing for scrolling a menu screen based on the position of the right hand P6 of the user.

FIG. 7 is a diagram illustrating an example of the menu screen. As illustrated in FIG. 7, a character 32 that performs an action corresponding to the action of the user is displayed on a menu screen 30. The position of each body part of the character 32 changes based on a change in three-dimensional coordinates of each body part of the user. That is, the character 32 can be interpreted as an image for showing the user (presenting the user with) the positions of the respective body parts of the user which are being detected by the game device 20. The user can grasp that the positions of the respective body parts are being normally detected by looking at the character 32.

In this case, the character 32 displayed on the menu screen 30 and the user are put in a state of facing each other, and hence the character 32 is set to perform a movement that is left-right reversed to the movement of the user. For example, in a case where the user raises their right hand, the displaying of the character 32 is updated so that its hand on the right side is raised in a case where viewed from the user in a real space. Note that the outline of the user may be extracted from a photographed image to thereby display an image subjected to left-right reversing processing on the menu screen 30 in place of the character 32.

Displayed on a menu region 34 are a plurality of item images 36 respectively indicating a plurality of menu items relating to the game. In a case where the item image 36 is selected by the user, processing corresponding to the selected item image 36 is executed.

The respective item images 36 included in the menu region 34 scrolls in a horizontal direction (the left-right direction) based on the position of the user's hand, and the item images 36 that appear within the menu region 34 change. In this case, in a case where the user holds out the right hand P6 frontward, the item images 36 are brought into a scrollable state, and after that, in a case where the user moves the right hand P6 in the left-right direction, the item images 36 start scrolling.

FIG. 8 is a diagram illustrating an example of the menu screen 30 in a case where the user holds out the right hand P6 in front. In the case where the user holds out the right hand P6 frontward, display control is performed so that the character 32 holds out its hand frontward on the right side when viewed from the user, and a mark 40 is displayed around a center of a scroll bar 38.

The mark 40 moves in the left-right direction on the scroll bar 38 based on the movement of the right hand P6 of the user. For example, in a case where the user slides the right hand P6 from a position in which the right hand P6 is held out frontward to the right side (moves the right hand P6 rightward), the mark 40 moves rightward on the scroll bar 38, and in the case where the user slides the right hand P6 from the position in which the right hand P6 is held out frontward to the left side (moves the right hand P6 leftward), the mark 40 moves leftward on the scroll bar 38.

The scroll bar 38 includes a stop instruction region 38a including a center point of the scroll bar 38, low speed instruction regions 38b adjacent to both ends of the stop instruction region 38a, and high speed instruction regions 38c, each of which is adjacent to the low speed instruction region 38b on the side that is not in contact with the stop instruction region 38a.

The item images 36 do not scroll in a state in which the mark 40 is within the stop instruction region 38a. That is, the item images 36 do not scroll in a case where the right hand P6 of the user is positioned around their front side. In a case where the user moves the right hand P6 to move the mark 40 into the low speed instruction region 38b, the item images 36 start scrolling.

Figure 9:
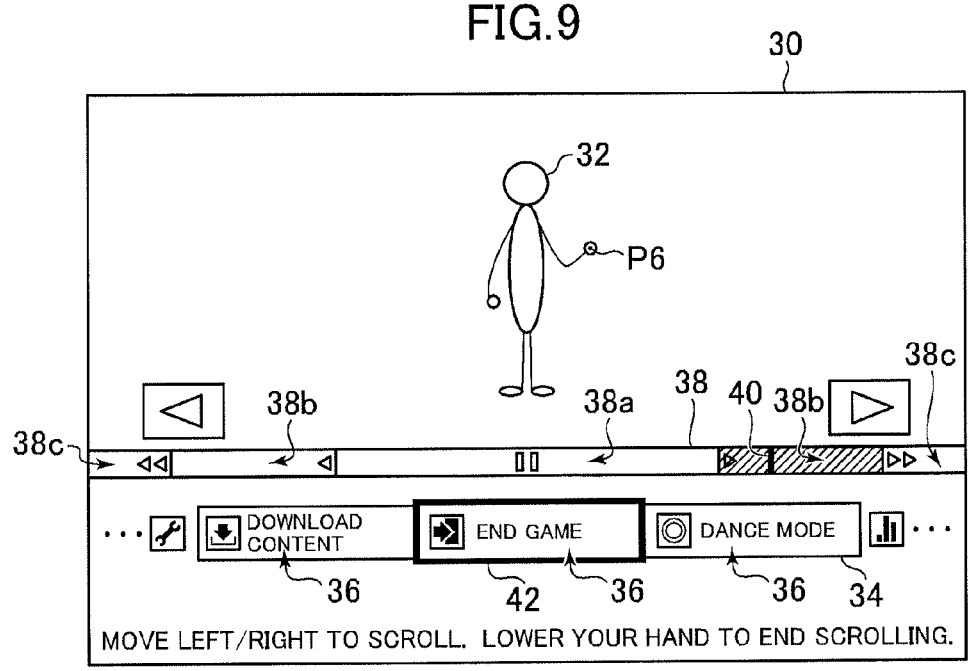
FIG. 9 is a diagram illustrating an example of the menu screen in a case where a mark has moved to a low speed instruction region.

FIG. 9 is a diagram illustrating an example of the menu screen 30 in a case where the mark 40 has moved to the low speed instruction region 38b. As illustrated in FIG. 9, in a case where the user moves the right hand P6 rightward to move the mark 40 to the low speed instruction region 38b, the respective item images 36 scroll at a low speed. In this state, the respective item images 36 scroll in such a manner that the item image 36 displayed within a cursor image 42 moves rightward at a rate of one per second. In a case where the user moves the right hand P6 further rightward, the mark 40 moves to the high speed instruction region 38c.

Figure 10:
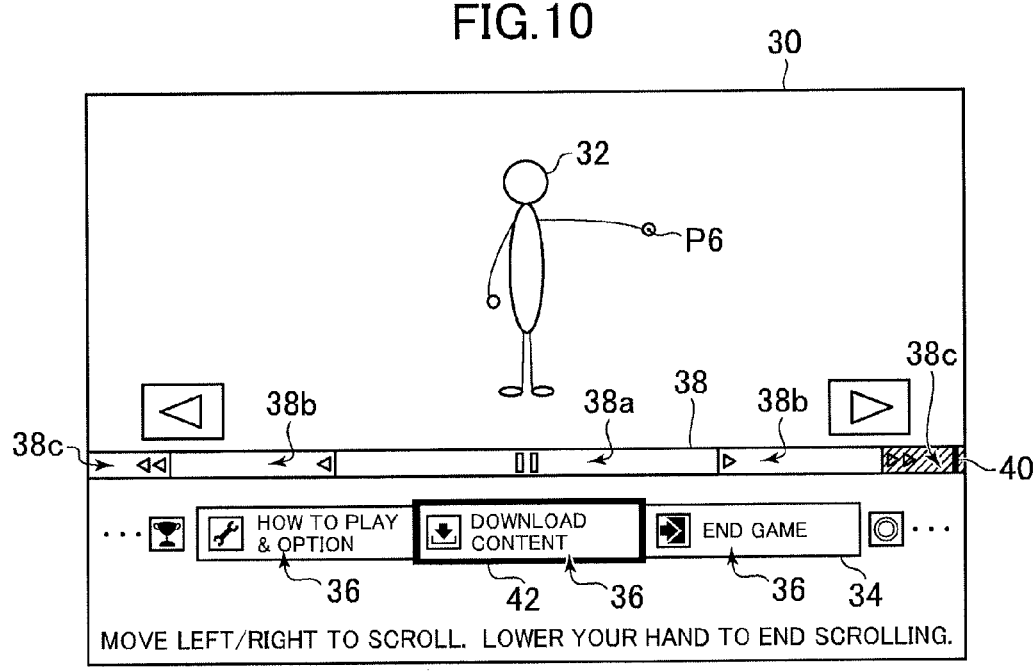
FIG. 10 is a diagram illustrating an example of the menu screen in a case where the mark has moved to a high speed instruction region.

FIG. 10 is a diagram illustrating an example of the menu screen 30 in a case where the mark 40 has moved to the high speed instruction region 38c. As illustrated in FIG. 10, in a case where the user moves the right hand P6 further rightward to move the mark 40 to the high speed instruction region 38c, the respective item images 36 scroll at a high speed. In this state, the respective item images 36 scroll in such a manner that the item image 36 displayed within a cursor image 42 moves rightward at a rate of five per second.

In the state illustrated in FIG. 10, in a case where the user moves the right hand P6 leftward to return the mark 40 to the low speed instruction region 38b, the state becomes a low speed scrolling state again. In a case where the user moves the right hand P6 further leftward to return the mark 40 to the stop instruction region 38a, the item images 36 stop scrolling. Note that the mark 40 may be erased to stop scrolling in a case where the user lowers the right hand P6.

In a case where the user raises the left hand P5, the processing corresponding to the menu item indicated by the item image 36 displayed within the cursor image 42 is executed. For example, in a case where the user raises the left hand P5 in the state illustrated in FIG. 8, the processing corresponding to a "dance mode" indicated by the item image 36 within the cursor image 42 is executed to start a game configured so that the user dances in tune with a music track. In the same manner, in a case where the user raises the left hand P5 in the state illustrated in FIG. 9, the game ends, and in a case where the user raises the left hand P5 in the state illustrated in FIG. 10, a transition is made to a screen for downloading content from a server (not shown) via a network.

In this manner, the game device 20 is configured to scroll the respective item images 36 without having the user feel that the operation is cumbersome by starting scrolling of the item images 36 or changing of a scrolling speed thereof based on the position of the right hand P6 of the user. Hereinafter, this technology is described in detail.

First, detailed description is given of hardware configurations of the position detecting device 1 and the game device 20.

(4. Configuration of Position Detecting Device)

Figure 11:
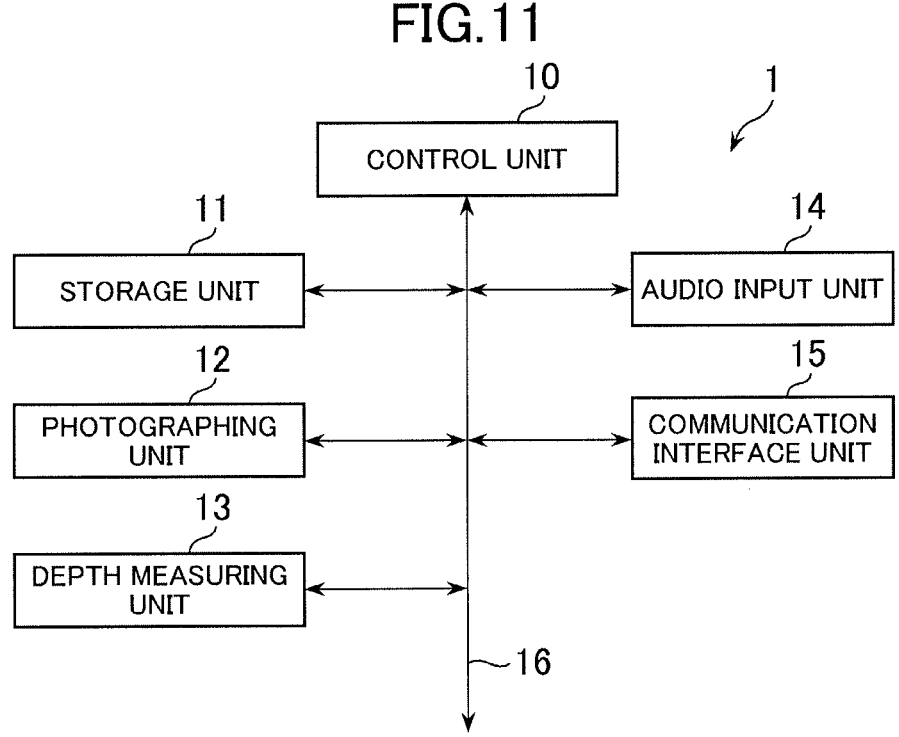
FIG. 11 is a diagram illustrating a hardware configuration of the position detecting device.

FIG. 11 is a diagram illustrating a hardware configuration of the position detecting device 1. As illustrated in FIG. 11, the position detecting device 1 includes a control unit 10, a storage unit 11, a photographing unit 12, a depth measuring unit 13, an audio input unit 14, and a communication interface unit 15. The respective components of the position detecting device 1 are connected to one another by a bus 16 so as to be able to exchange data between them.

The control unit 10 controls the respective units of the position detecting device 1 based on an operating system and various kinds of programs which are stored in the storage unit 11.

The storage unit 11 stores programs and various kinds of parameters which are used for operating the operating system, the photographing unit 12, and the depth measuring unit 13. Further, the storage unit 11 stores a program for generating the user body part information based on the photographed image and the depth image.

The photographing unit 12 includes the CCD camera 2 and the like. The photographing unit 12 generates, for example, the photographed image of the user. The depth measuring unit 13 includes the infrared sensor 3 and the like. The depth measuring unit 13 generates the depth image based, for example, on the TOF acquired by the infrared sensor 3. As described above, the control unit 10 generates the user body part information based on the photographed image generated by the photographing unit 12 and the depth image generated by the depth measuring unit 13 at predetermined time intervals (for example, every 1/60th of a second).

The audio input unit 14 includes, for example, the microphone 4. The communication interface unit 15 is an interface for transmitting various kinds of data, such as the user body part information, to the game device 20.

(5. Configuration of Game Device)

Figure 12:
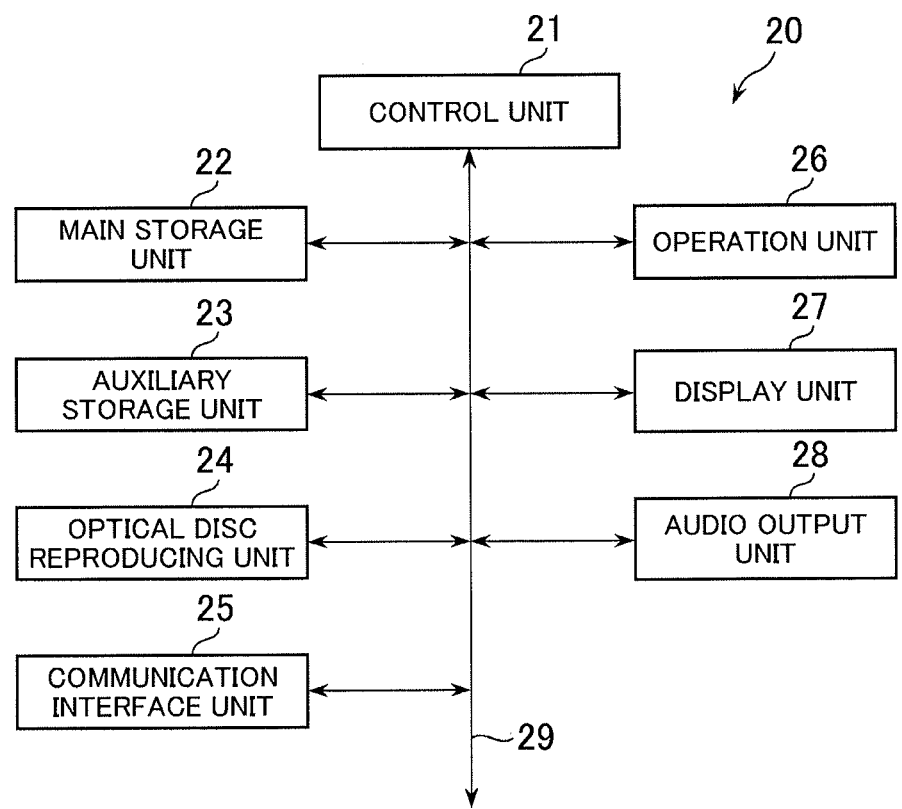
FIG. 12 is a diagram illustrating a hardware configuration of a game device.

FIG. 12 is a diagram illustrating a hardware configuration of the game device 20. As illustrated in FIG. 12, the game device 20 includes a control unit 21, a main storage unit 22, an auxiliary storage unit 23, an optical disc reproducing unit 24, a communication interface unit 25, an operation unit 26, a display unit 27, and an audio output unit 28. The respective components of the game device 20 are connected to one another by a bus 29.

The control unit 21 includes, for example, a CPU, a graphics processing unit (GPU), and a sound processing unit (SPU). The control unit 21 executes various kinds of processing in accordance with an operating system and other programs.

The main storage unit 22 includes, for example, a random access memory (RAM). The auxiliary storage unit 23 includes, for example, a hard disk drive (non-transitory information storage medium). The main storage unit 22 stores programs and data read from the auxiliary storage unit 23 or an optical disc (non-transitory information storage medium). Further, the main storage unit 22 is also used as a work memory for storing data required in the course of the processing. Further, for example, the main storage unit 22 chronologically stores the user body part information received from the position detecting device 1.

The optical disc reproducing unit 24 reads programs and data stored on the optical disc. For example, a game program is stored on the optical disc.

The communication interface unit 25 is an interface for communicatively connecting the game device 20 to a communication network. The game device 20 acquires the user body part information from the position detecting device 1 via the communication interface unit 25.

The operation unit 26 is used by the user to perform various kinds of operations. The operation unit 26 includes, for example, a game controller, a touch panel, a mouse, or a keyboard. The display unit 27 is, for example, a consumer television set or a liquid crystal display panel. The display unit 27 displays a screen in accordance with an instruction from the control unit 21. The audio output unit 28 includes, for example, a speaker or headphones.

In this embodiment, description is given of a case where the various kinds of programs and data are supplied to the game device 20 via the optical disc. Note that those programs and data may be supplied to the game device 20 via another non-transitory information storage medium (for example, memory card). Alternatively, the programs and data may be supplied from a remote site to the game device 20 via the communication network.

(6. Functions Implemented on Game Device)

Figure 13:
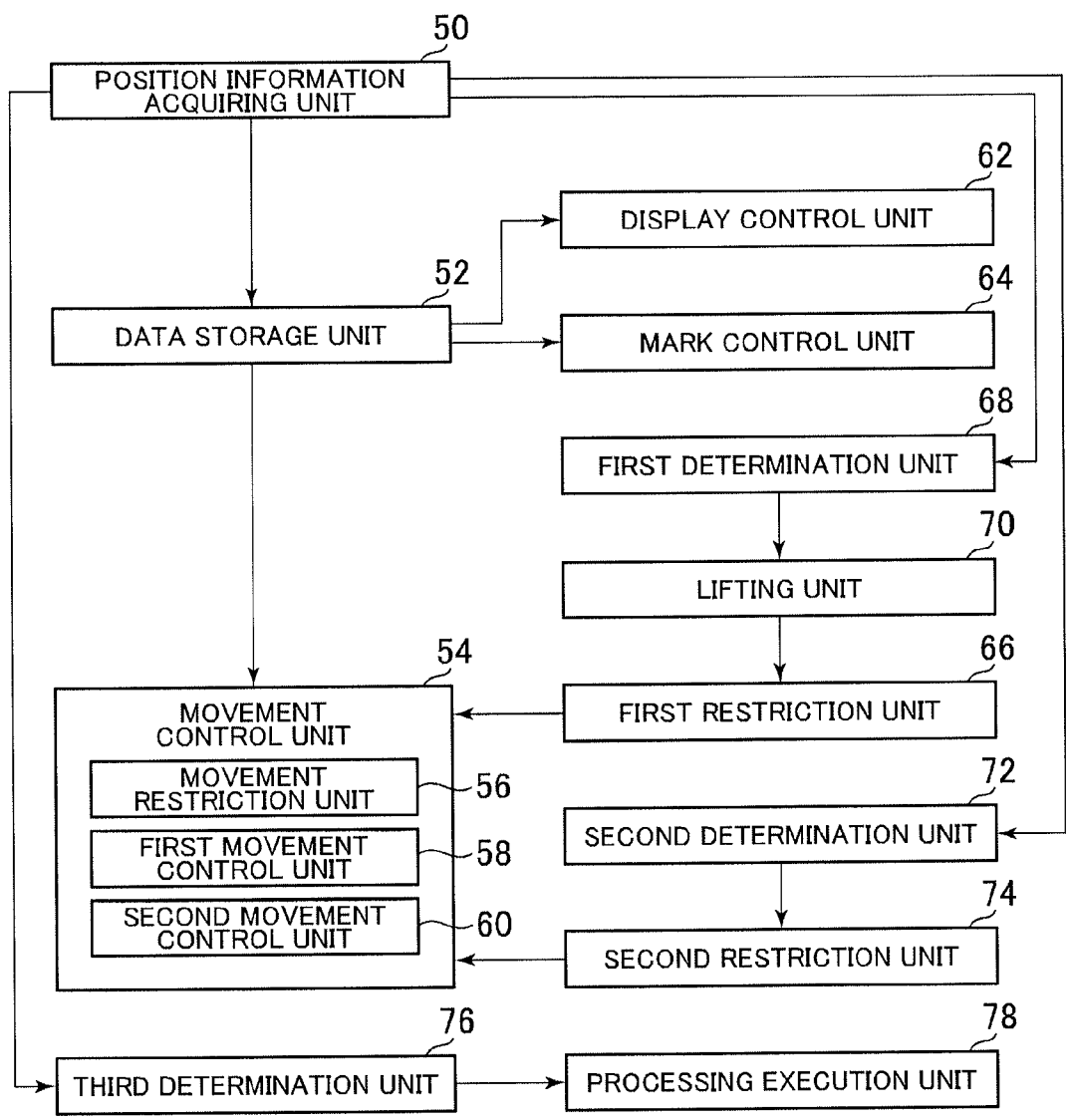
FIG. 13 is a functional block diagram illustrating functions implemented on the game device.

FIG. 13 is a functional block diagram illustrating functions implemented on the game device 20. As illustrated in FIG. 13, on the game device 20, there are implemented a position information acquiring unit 50, a data storage unit 52, a movement control unit 54, a display control unit 62, a mark control unit 64, a first restriction unit 66, a first determination unit 68, a lifting unit 70, a second determination unit 72, a second restriction unit 74, a third determination unit 76, and a processing execution unit 78. Those functions are implemented by the control unit 21 operating in accordance with programs read from the optical disc.

(6-1. Position Information Acquiring Unit)

The position information acquiring unit 50 is implemented mainly by the control unit 21. The position information acquiring unit 50 acquires position information relating to the position within the real space of the user's hand or a grasped object grasped by the user or the position within the display screen or the virtual space corresponding to the above-mentioned position. In this embodiment, the description is directed to a case where the position information indicates the position within the real space of a first hand (in this case, the right hand P6) of the user. That is, the description is directed to a case where the position information is included in the user body part information generated by the position detecting device 1. A case where the position information indicates the position of the grasped object and a case where the position information indicates the position within the display screen or the virtual space are described later in modified examples.

The position information acquiring unit 50 acquires the position information based on the photographed image obtained from photographing means for photographing the user existing in the real space. For example, the position information acquiring unit 50 acquires the position information from position information generation means for generating the position information based on the photographed image obtained from the photographing means for photographing the user and depth information relating to an interval between the measurement reference position of depth measuring means and the user. In this case, the position information acquiring unit 50 acquires the position information by acquiring the user body part information. In a case where the position information acquiring unit 50 acquires the user body part information, the user body part information is stored in history data described later.

(6-2. Data Storage Unit)

The data storage unit 52 is implemented mainly by the main storage unit 22, the auxiliary storage unit 23, and the optical disc. The data storage unit 52 stores various kinds of information necessary to scroll the item images 36. For example, the data storage unit 52 stores the history data storing the user body part information chronologically and menu item data relating to the respective item images 36.

Figure 14:
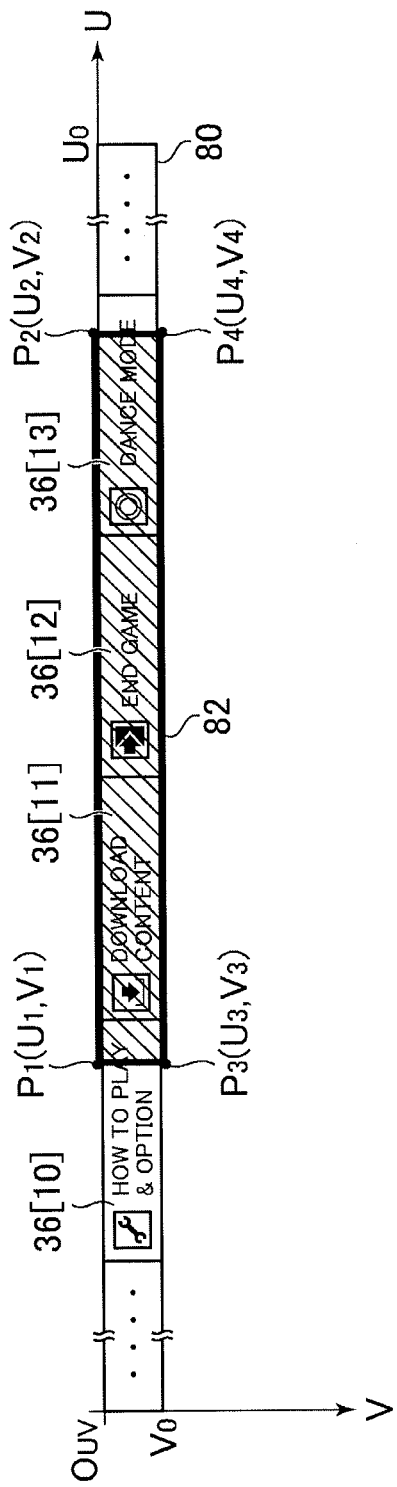
FIG. 14 is an explanatory diagram for illustrating a content of menu item data.

FIG. 14 is an explanatory diagram for illustrating a content of the menu item data. As illustrated in FIG. 14, the menu item data includes an item image group 80 obtained by arranging the respective item images 36 laterally in a row. In this case, 25 item images 36 are prepared, and each thereof is referred to as "item image 36[$n$]" ($n$: integer of 1 to 25). The shape of the respective item images 36[$n$] may be the same or may be different from one another.

The position of each of the item images 36[$n$] included in the item image group 80 is identified by two-dimensional coordinates (for example, U-V coordinates) set on the item image group 80. In this embodiment, the upper left corner of the item image group 80 is set as an origin $O_{UV}$, a U-axis is set in the horizontal direction, and a V-axis is set in a vertical direction. For example, the item image group 80 has a size of a region defined by a U coordinate of 0 to $U_0$ and a V coordinate of 0 to $V_0$.

A display subject region 82 having a rectangular shape is set on the item image group 80. The display subject region 82 indicates a range to be displayed in the menu region 34 within the item image group 80. The item image group 80 within the display subject region 82 is to be displayed in the menu region 34. An aspect ratio of the display subject region 82 is set so as to correspond to the aspect ratio of the menu region 34.

Note that in the following description, as illustrated in FIG. 14, respective vertices of the display subject region 82 are set as an upper left point $P_1$ ($U_1,V_1$), an upper right point $P_2$ ($U_2,V_2$) a lower left point $P_3$ ($U_3,V_3$) and a lower right point $P_4$ ($U_4,V_4$). For example, the coordinates of the respective vertices are stored in the menu item data as information indicating a current position of the display subject region 82.

In a case where the display subject region 82 moves rightward, the menu screen 30 is subjected to the display control so that the respective item images 36 within the menu region 34 scroll leftward. On the other hand, in a case where the display subject region 82 moves leftward, the menu screen 30 is subjected to the display control so that the respective item images 36 within the menu region 34 scroll rightward.

Note that the data stored in the data storage unit 52 is not limited to the above-mentioned example. The data storage unit 52 may be configured to store various kinds of data necessary to scroll the item images 36. Alternatively, for example, data on the respective images displayed on the menu screen 30 and the like may be stored. Further, the control unit 21 functions as means for acquiring various kinds of data stored in the data storage unit 52 and means for updating contents of the data.

(6-3. Movement Control Unit)

The movement control unit 54 is implemented mainly by the control unit 21. The movement control unit 54 performs, based on the position information, movement control on the movement subject (item images 36) that moves within the display screen (menu screen 30) or the virtual space. In this embodiment, the movement subject is the item images 36 respectively indicating the plurality of menu items. The movement control unit 54 moves the plurality of item images 36 within the display screen (menu screen 30).

The movement control unit 54 includes a movement restriction unit 56, a first movement control unit 58, and a second movement control unit 60.

(Movement Restriction Unit)

The movement restriction unit 56 restricts the movement of the movement subject (item images 36) in a case where a numerical value indicating a magnitude of a displacement between a position indicated by the position information and a reference position or a reference direction (hereinafter, the numerical value indicating the magnitude of the displacement is referred to simply as "numerical value") is smaller than a first reference value. The first reference value is a predetermined value that defines a range of the numerical value for restricting the scrolling of the item images 36.

The reference position is a predetermined position set on the display screen or in the real space. The reference position can be interpreted as a position that defines a range within which the position indicated by the position information is to fall in a case where the movement of the movement subject is restricted. For example, the reference position is set on the display screen based on a display position of the scroll bar 38 (position of a representative point thereof), and the reference position is set in the real space based on a position of the user's body (position of the representative point of the user's body; for example, position of a representative body part of the user).

The reference direction is a predetermined direction set in the real space. The reference direction can be interpreted as the predetermined direction in which a direction defined based on the position information is directed in the case where the movement of the movement subject is restricted (direction toward a position indicated by the position information from a user reference position described later). For example, the reference direction is set in the real space based on the position of the user's body (position of the representative point of the user's body; for example, position of the representative body part of the user).

In the following, description is given of a case where the reference direction is used. Further, in this embodiment, the description is directed to a case where the above-mentioned numerical value represents an angle between a direction from the user reference position relating to the position of the user's body toward the position indicated by the position information and the reference direction set in the real space. The user reference position is the position defined based on the position of the user's body, for example, any one of positions indicated by the user body part information. In the following, the description is directed to a case where the position of the right shoulder P4 of the user is used as the user reference position.

Figure 15:
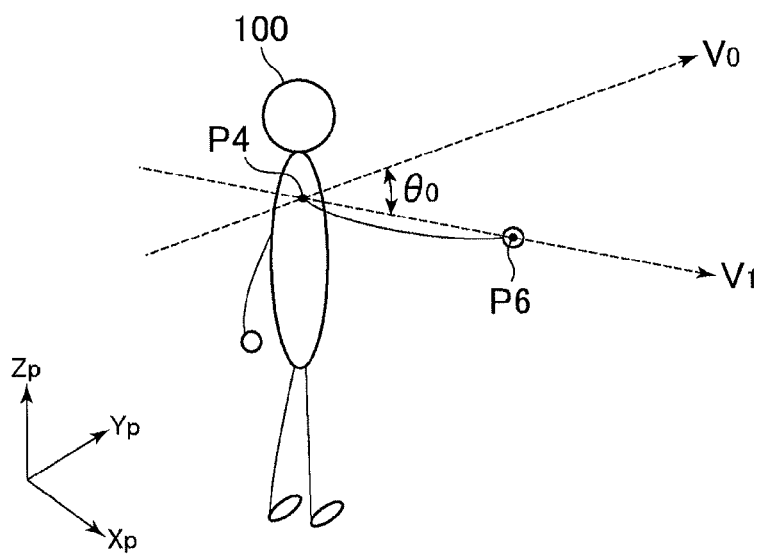
FIG. 15 is a perspective view of a real space.

FIG. 15 is a perspective view of the real space. As illustrated in FIG. 15, for example, a direction of the right hand P6 (right arm) in the case where the user holds out the right hand P6 frontward (that is, direction toward the front side of the user) is set as a reference direction $V_0$. Further, in this embodiment, an angle $\theta_0$ formed between a direction $V_1$ from the position of the right shoulder P4 of the user toward the current position of the right hand P6 and the reference direction $V_0$ is acquired. That is, in this case, the position of the right shoulder P4 corresponds to the user reference position. The angle $\theta_0$ increases in a case where the user holds out the right hand P6 laterally (in the horizontal direction), and the angle $\theta_0$ decreases in a case where the user moves the right hand P6 frontward.

In a case where the angle $\theta_0$ is smaller than a first reference angle $\theta_1$, the movement restriction unit 56 restricts the movement of the movement subject (item images 36). The first reference angle $\theta_1$ is a predetermined angle for defining the range of the angle $\theta_0$ for restricting the scrolling of the item images 36, and is set to 30° in this embodiment.

The wording "restricting the movement of the item images 36" represents suppressing the movement of the item images 36 and stopping the item images 36. That is, in this embodiment, in a case where the angle $\theta_0$ is smaller than 30°, the item images 36 stop without scrolling.

(First Movement Control Unit)

In a case where the numerical value (the angle $\theta_0$) is equal to or larger than the first reference value (first reference angle $\theta_1$) and is smaller than a second reference value (second reference angle $\theta_2$) larger than the first reference value, the first movement control unit 58 moves the movement subject (item images 36) at a first speed in the direction defined based on the position information or the predetermined direction. The second reference value defines a threshold value for changing a moving speed of the item images 36.

The wording "direction defined based on the position information" represents a direction defined based on a positional relation between the position indicated by the position information and the reference position or the reference direction, and is a direction in which the position indicated by the position information exists in a case where viewed from the reference position or the reference direction. In this case, the item images 36 scroll rightward (that is, the display subject region 82 moves leftward) in a case where the right hand P6 of the user is placed on the right side of the reference direction $V_0$, and the item images 36 scroll leftward (that is, the display subject region 82 moves rightward) in a case where the right hand P6 of the user is placed on the left side of the reference direction $V_0$. The "predetermined direction" represents one or a plurality of directions preset in the display screen or the virtual space, and is a moving direction in which the movement subject is to move.

The first speed is a predefined speed, and corresponds to a first distance that the movement subject is to move per unit time. In this embodiment, the scrolling speed at which the item images 36 move in the horizontal direction at the rate of one image per second (that is, speed defined based on a lateral width of the item image 36) is set as the first speed. Note that in the following description, moving the item image 36 at the first speed is referred to also as "low-speed scrolling".

In this case, the second reference angle $\theta_2$ is used as the second reference value. The second reference angle $\theta_2$ is used to define an angle for changing the scrolling speed of the item image 36, and is set to 60° in this case. Note that as the first reference angle $\theta_1$ and the second reference angle $\theta_2$, arbitrary angles may be set based on a range of motion of a human hand.

(Second Movement Control Unit)

In a case where the numerical value (the angle $\theta_0$) is equal to or larger than the second reference value (second reference angle $\theta_2$), the second movement control unit 60 moves the movement subject (item images 36) at a second speed faster than the first speed in the direction defined based on the position information or the predetermined direction.

The second speed is a predefined speed, and corresponds to a second distance (second distance>first distance) that the movement subject is to move per unit time. In this embodiment, the scrolling speed at which the item images 36 move in the horizontal direction at the rate of five per second is set as the first speed.

(6-3. Display Control Unit)

The display control unit 62 is implemented mainly by the control unit 21. The display control unit 62 displays on the display screen (menu screen 30) a first image (scroll bar 38) that extends in a direction corresponding to the moving direction (horizontal direction) of the movement subject (item images 36) and a second image (mark 40) that moves on the first image in an extending direction thereof (direction corresponding to the moving direction).

The direction corresponding to the moving direction of the movement subject represents a direction on the display screen which is defined based on the moving direction of the movement subject, and in this case, is a direction in which the display position of the item images 36 moves (scrolling direction). In this embodiment, the item images 36 move in the horizontal direction, and hence the scroll bar 38 has a shape that extends in the horizontal direction, for example, a rectangular shape which is long in the horizontal direction.

(6-4. Mark Control Unit)

A mark control unit 64 is implemented mainly by the control unit 21. The mark control unit 64 moves the second image (mark 40) on the first image (scroll bar 38) so that the positional relation between the representative point of the first image (scroll bar 38) and the display position of the second image (mark 40) corresponds to the positional relation between the position indicated by the position information and the reference position or the reference direction.

The representative point of the scroll bar 38 represents a position associated with the scroll bar 38 (for example, predetermined position inside the scroll bar 38), for example, the center point of the scroll bar 38.

The mark control unit 64 moves the mark 40 so that the displacement (distance or angle) between the representative point of the scroll bar 38 and the display position of the mark 40 corresponds to the displacement ("numerical value" in this embodiment) between the position indicated by the position information and the reference position or the reference direction. For example, the mark control unit 64 moves the mark 40 so that the displacement between the representative point of the scroll bar 38 and the display position of the mark 40 becomes larger as the displacement between the position indicated by the position information and the reference position or the reference direction becomes larger.

Figure 16:
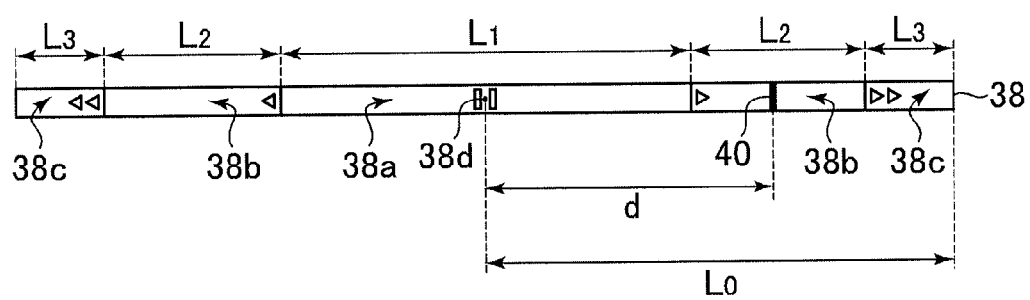
FIG. 16 is a diagram illustrating how the mark moves on a scroll bar.

FIG. 16 is a diagram illustrating how the mark 40 moves on the scroll bar 38. As illustrated in FIG. 16, the display position of the mark 40 is determined so that a distance d between a center point 38d of the scroll bar 38 and the display position of the mark 40 corresponds to the angle $\theta_0$ of the right hand P6 of the user. For example, assuming that the length of a long side of the scroll bar 38 is $2L_0$, the display position of the mark 40 is determined so that the distance $d=L_0 * \sin \theta_0$.

Further, the first image (scroll bar 38) includes a first region (stop instruction region 38a) which has a length corresponding to the first reference value and includes the representative point. The length corresponding to the first reference value represents a length defined based on the first reference value, and is a length having a predetermined relationship with the first reference value (length defined based on a predetermined mathematical expression).

For example, as the first reference value becomes larger, the length of the stop instruction region 38a becomes longer. In this case, a length $L_1$ of the stop instruction region 38a is set so that the mark 40 is positioned at an end portion of the stop instruction region 38a in a case where the angle $\theta_0$ becomes 30°. For example, the setting is performed so that the length $L_1=2L_0 * \sin \theta_1$.

Further, the first image (scroll bar 38) includes a second region (low speed instruction region 38b) which has a length corresponding to a difference between the second reference value and the first reference value and is adjacent to the first region (stop instruction region 38a). The length corresponding to the difference between the second reference value and the first reference value represents a length defined based on the difference, and is a length having a predetermined relationship with the difference (length defined based on a predetermined mathematical expression).

For example, as the difference between the second reference value and the first reference value becomes larger, the length of the low speed instruction region 38b becomes longer. In this case, the setting is performed so that a length $L_2=L_0 * (\sin \theta_2 - \sin \theta_1)$. The low speed instruction region 38b is located so as to have one end in contact with the stop instruction region 38a. In this case, as illustrated in FIG. 16, two low speed instruction regions 38b are located so as to sandwich the stop instruction region 38a.

Further, the first image (scroll bar 38) includes a third region (high speed instruction region 38c) which has a predetermined length and is adjacent to a side opposite to a side on which the second region (low speed instruction region 38b) is adjacent to the first region (stop instruction region 38a). In this case, the predetermined length is set so that a length $L_3=L_0-L_1/2-L_2$.

The "side opposite to the side on which the low speed instruction region 38b is adjacent to the stop instruction region 38a" represents a side of one of end portion of the low speed instruction region 38b which is opposite to the end portion adjacent to the stop instruction region 38a. In this case, as illustrated in FIG. 16, two high speed instruction regions 38c are located so as to sandwich the stop instruction region 38a and the low speed instruction regions 38b.

The mark control unit 64 moves the second image (mark 40) on the first region (stop instruction region 38a) in the case where the restriction is performed by the movement restriction unit 56, moves the second image on the second region (low speed instruction region 38b) in the case where the control is performed by the first movement control unit 58, and moves the second image on the third region (high speed instruction region 38c) in the case where the control is performed by the second movement control unit 60.

(6-6. First Restriction Unit)

The first restriction unit 66 is implemented mainly by the control unit 21. The first restriction unit 66 restricts the movement control performed by the movement control unit 54. The wording "restricting the movement control performed by the movement control unit 54" represents suppressing the movement control performed by the movement control unit 54, and represents inhibiting the movement control unit 54 from moving the item image 36. In this case, in a case where the restriction is performed by the first restriction unit 66, the mark 40 is erased from the scroll bar 38, and the item images 36 are brought into a stopped state without scrolling.

(6-7. First Determination Unit)

The first determination unit 68 is implemented mainly by the control unit 21. The first determination unit 68 determines whether or not the user has held out their hand frontward based on information (in this embodiment, position information) relating to the position within the real space of the user's hand or the grasped object grasped by the user. For example, the first determination unit 68 determines that the user has held out their hand frontward, in a case where the position indicated by the above-mentioned information is placed apart from the user reference position by equal to or larger than a predetermined distance.

(6-8. Lifting Unit)

The lifting unit 70 is implemented mainly by the control unit 21. The lifting unit 70 lifts the restriction of the movement control performed by the movement control unit 54, in a case where the user holds out their hand. The wording "lifting the restriction of the movement control performed by the movement control unit 54" represents permitting the movement control unit 54 to perform the movement control, and means that the movement control unit 54 moves the item image 36. In a case where the restriction performed by the movement control unit 54 is lifted, the mark 40 is displayed on the scroll bar 38, and the item images 36 are brought into a scrollable state.

(6-9. Second Determination Unit)

The second determination unit 72 is implemented mainly by the control unit 21. In a state in which the movement control is being performed by the movement control unit 54, the second determination unit 72 determines whether or not the user has lowered their hand (the user has held out their hand downward) based on the information (in this embodiment, position information) relating to the position within the real space of the user's hand or the grasped object grasped by the user. The second determination unit 72 determines that the user has lowered their hand by determining whether or not the position indicated by the above-mentioned information becomes equal to or lower than a reference height.

(6-10. Second Restriction Unit)

The second restriction unit 74 is implemented mainly by the control unit 21. The second restriction unit 74 restricts the movement control performed by the movement control unit 54, in a case where it is determined that the user has lowered their hand.

(6-11. Third Determination Unit)

The third determination unit 76 is implemented mainly by the control unit 21. The third determination unit 76 determines whether or not a second hand of the user or the grasped object grasped by the second hand has performed a given action. In this case, the right hand P6 corresponds to the first hand, and hence the left hand P5 corresponds to the second-hand. Further, in this embodiment, information relating to the position within the real space of the second hand of the user or the grasped object grasped by the user with the second hand is acquired by the position information acquiring unit 50. That is, this information is included in the user body part information.

The given action represents a predetermined action relating to the hand, for example, an action of holding out the hand in the predetermined direction or an action of placing the hand in a predetermined position. The third determination unit 76 determines whether or not the left hand P5 of the user has performed a given action by comparing the position of the left hand P5 with a given criterion relating to the position. In this case, it is determined whether or not the user has raised the left hand P5. For example, the third determination unit 76 determines whether or not the user has raised the left hand P5 by determining whether or not the position of the left hand P5 is equal to or higher than the reference height.

(6-12. Processing Execution Unit)

The processing execution unit 78 is implemented mainly by the control unit 21. In a case where it is determined that the second hand of the user or the grasped object grasped by the second hand has performed the given action, the processing execution unit 78 executes the processing corresponding to the menu item of the item image 36 displayed in a predetermined position on the display screen. The predetermined position represents a predefined position within the display screen, for example, a position indicated by a given image. In this embodiment, the position of the cursor image 42 corresponds to the predetermined position.

The menu item is previously associated with a content of the processing to be executed by the processing execution unit 78. Data representing this association is stored in the data storage unit 52, and may be in the form of a table or may be an instruction described in a program.

(7. Processing Executed on the Game Device)

Figure 17:
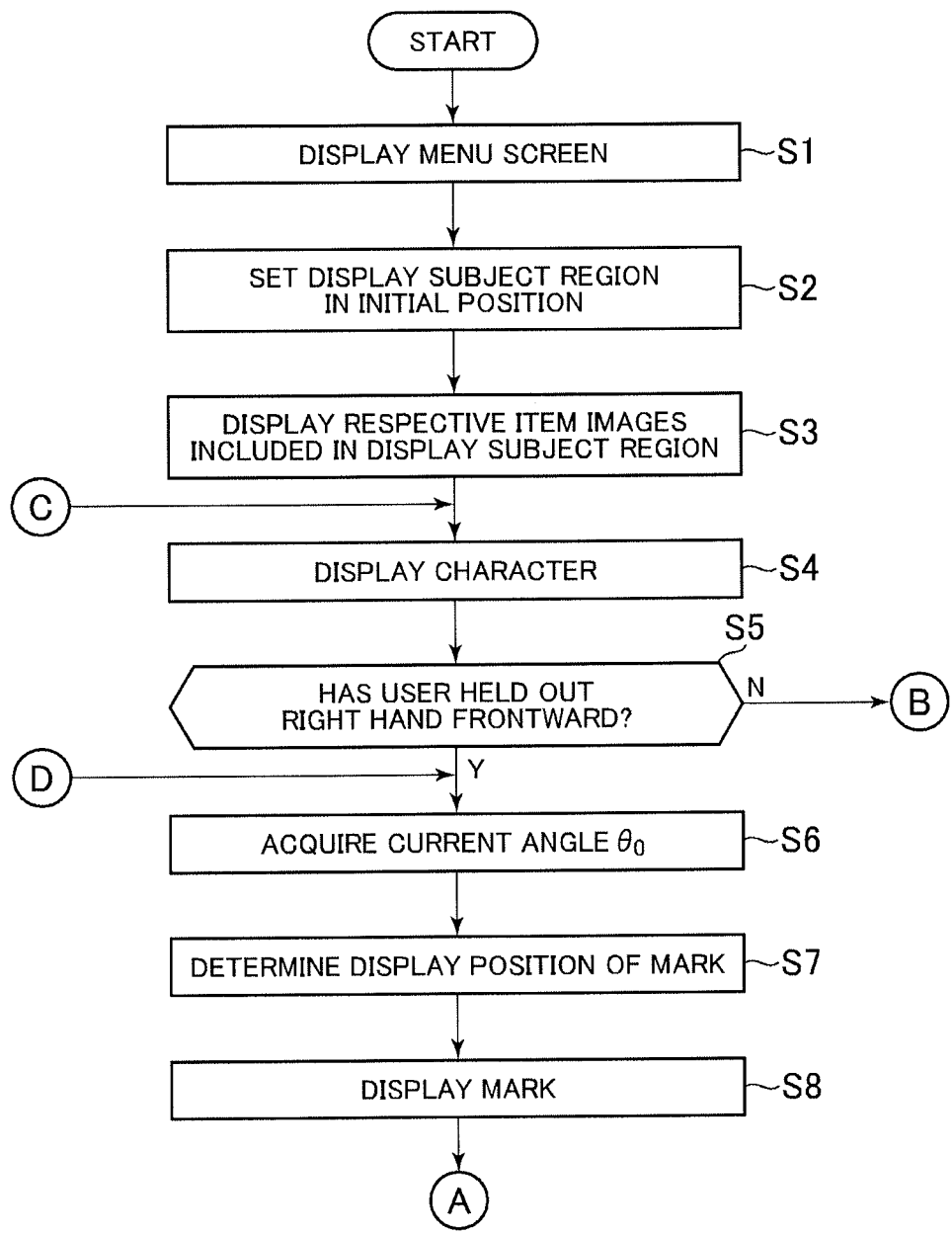
FIG. 17 is a flowchart illustrating an example of processing executed on the game device.
Figure 18:
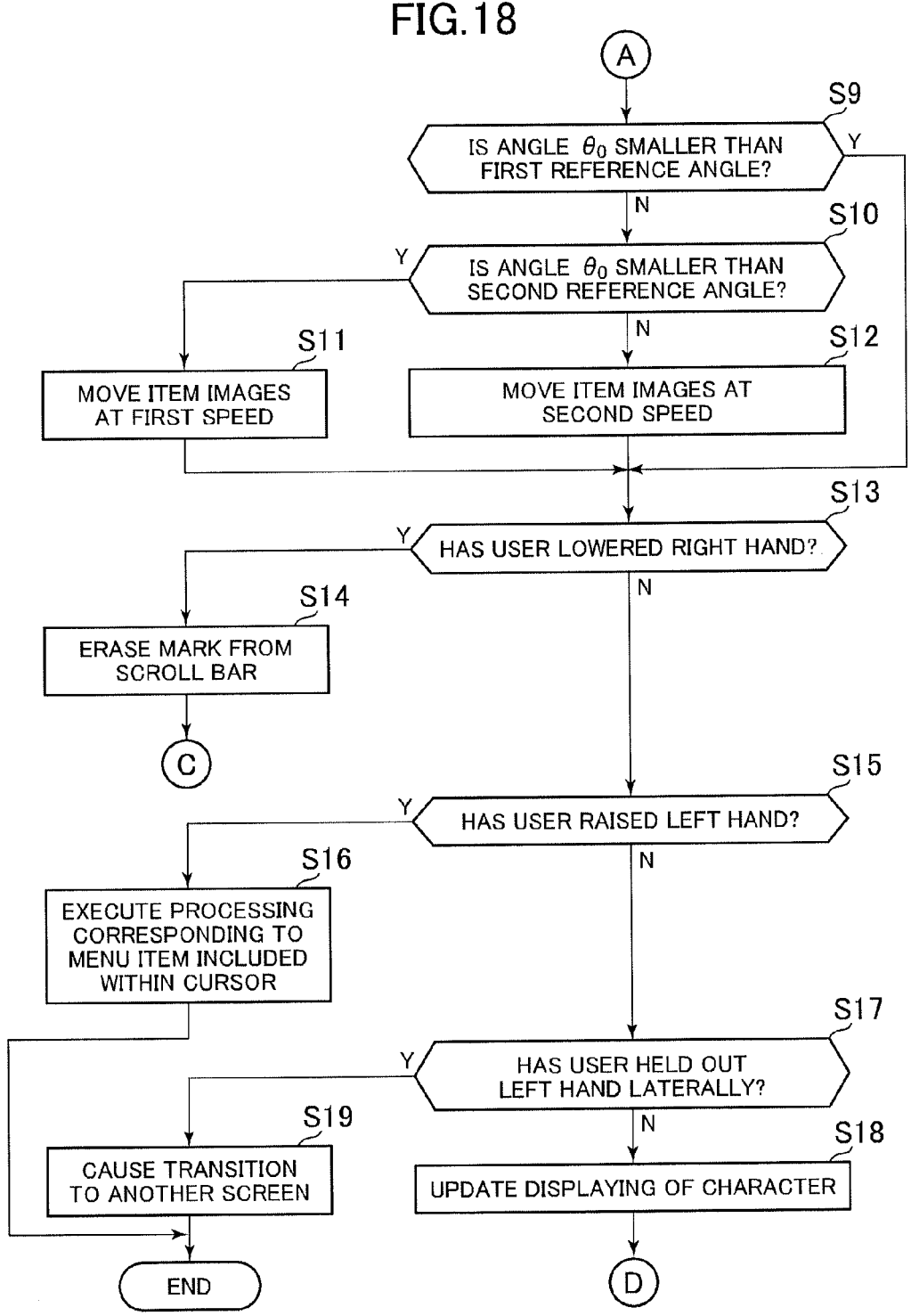
FIG. 18 is a flowchart illustrating an example of the processing executed on the game device.

FIGS. 17 and 18 are flowcharts illustrating an example of the processing executed on the game device 20. The processing of FIGS. 17 and 18 is executed by the control unit 21 operating in accordance with the program read from the optical disc in a case where an instruction to display the menu screen 30 is issued.

As illustrated in FIG. 17, first, the control unit 21 causes the display unit 27 to display the menu screen 30 (S1). The control unit 21 sets the display subject region 82 in an initial position (S2). The initial position of the display subject region 82 may be a previously designated position, or a position at a time in a case where the menu screen 30 was ended last time may be stored and used as the initial position. The position of the display subject region 82 is stored in the menu item data.

The control unit 21 displays on the menu region 34 the respective item images 36 included in the display subject region 82 within the item image group 80 (S3). The control unit 21 displays the character 32 on the menu screen 30 based on the user body part information acquired from the position detecting device 1 (S4).

The control unit 21 determines whether or not the user has held out the right hand P6 frontward (S5). In Step S5, it is determined whether or not the user has held out the right hand P6 frontward by determining whether or not the three-dimensional coordinates indicating the position of the right hand P6 of the user have been placed in front of the right shoulder P4 of the user by equal to or larger than a predetermined distance.

In a case where it is determined that the user has held out the right hand P6 frontward (S5; Y), the control unit 21 acquires the current angle $\theta_0$ (S6). In Step S6, the angle $\theta_0$ is acquired by calculating an angle formed between the direction $V_1$ of a straight line that connects the position of the right shoulder P4 and the position of the right hand P6 and the reference direction $V_0$.

The control unit 21 determines the display position of the mark 40 based on the angle $\theta_0$ (S7). In Step S7, the display position of the mark 40 is determined so that the angle $\theta_0$ is associated with a distance between the mark 40 and the center point of the scroll bar 38. For example, data obtained by associating the criterion relating to the angle $\theta_0$ with the display position of the mark 40 may be stored on the optical disc or the like. The data may be in the form of a table, or may be in the form of a mathematical expression. The criterion relating to the angle $\theta_0$ represents the criterion indicating whether or not the angle $\theta_0$ falls within a predetermined range. The mark 40 is displayed in the position associated with the criterion satisfied by the angle $\theta_0$.

The control unit 21 displays the mark 40 in the display position determined in Step S7 (S8). Referring to FIG. 18, the control unit 21 determines whether or not the angle $\theta_0$ is smaller than the first reference angle $\theta_1$ (S9). In a case where it is determined that the angle $\theta_0$ is smaller than the first reference angle $\theta_1$ (S9; Y), the processing advances to Step S13. That is, in this case, the position of the display subject region 82 is fixed, and hence the item images 36 are restricted so as not to move.

On the other hand, in a case where it is determined that the angle $\theta_0$ is equal to or larger than the first reference angle $\theta_1$ (S9; N), the control unit 21 determines whether or not the angle $\theta_0$ is smaller than the second reference angle $\theta_2$ (S10). In a case where it is determined that the angle $\theta_0$ is smaller than the second reference angle $\theta_2$ (S10; Y), the control unit 21 moves the item images 36 at the first speed (S11).

In Step S11, in a case where the right hand P6 of the user is placed on the right side of the reference direction $V_0$ (right side in a case where viewed from the user), the control unit 21 moves the item images 36 rightward at the first speed by moving the display subject region 82 leftward at the first speed. In a case where the right hand P6 of the user is placed on the left side of the reference direction $V_0$ (left side in a case where viewed from the user), the control unit 21 moves the item images 36 leftward at the first speed by moving the display subject region 82 rightward at the first speed.

On the other hand, in a case where it is determined that the angle $\theta_0$ is equal to or larger than the second reference angle $\theta_2$ (S10), the control unit 21 moves the item images 36 at the second speed (S12). In Step S12, in a case where the right hand P6 of the user is placed on the right side of the reference direction $V_0$ (right side in a case where viewed from the user), the control unit 21 moves the item images 36 rightward at the second speed by moving the display subject region 82 leftward at the second speed. In a case where the right hand P6 of the user is placed on the left side of the reference direction $V_0$ (left side in a case where viewed from the user), the control unit 21 moves the item images 36 leftward at the second speed by moving the display subject region 82 rightward at the second speed.

The control unit 21 determines whether or not the user has lowered the right hand P6 (S13). In Step S13, it is determined whether or not the user has lowered the right hand P6 by determining whether or not the three-dimensional coordinates indicating the position of the right hand P6 of the user are lower than the reference height.

In a case where it is determined that the user has lowered the right hand P6 (S13; Y), the control unit 21 erases the mark 40 from the scroll bar 38 (S14), and the processing returns to Step S4. In this case, scroll control is kept restricted until the user again holds out the right hand P6 frontward.

The control unit 21 determines whether or not the user has raised the left hand P5 (S15). In Step S15, it is determined whether or not the user has raised the left hand P5 by determining whether or not the three-dimensional coordinates indicating the position of the left hand P5 of the user are higher than the reference height. The reference height used here may be the same as the reference height used for the determination in Step S13 or may be different therefrom.

In a case where it is determined that the user has raised the left hand P5 (S15; Y), the control unit 21 executes the processing corresponding to the item image 36 included within the cursor image 42 (S16), and the processing is brought to an end.

The control unit 21 determines whether or not the user has held out the left hand P5 laterally (S17). In Step S17, it is determined whether or not the user has held out the left hand P5 laterally by determining whether or not the three-dimensional coordinates indicating the position of the left hand P5 of the user have been placed apart from the left shoulder P3 by equal to or larger than a predetermined distance.

In a case where it is not determined that the user has held out the left hand P5 laterally (S17; N), the control unit 21 updates the displaying of the character 32 based on the most recent position information (S18), and the processing returns to Step S6. In this case, the angle $\theta_0$ is acquired again based on the position of the right hand P6 of the user, and processing for scrolling the item images 36 is executed.

On the other hand, in a case where it is determined that the user has held out the left hand P5 laterally (S17; Y), the control unit 21 causes the menu screen 30 to transition to another screen (S19), and the processing is brought to an end.

According to the game device 20 described above, the item images 36 can be restricted so as not to scroll in a case where the angle $\theta_0$ is relatively small. Compared to a case where the item images 36 are likely to start scrolling in a case where the user moves the right hand P6 only by a small amount, it is easy to issue an instruction to start scrolling without an erroneous operation. In addition, the scrolling speed can be increased stepwise as the angle $\theta_0$ becomes larger, and hence the item images 36 are allowed to scroll without having the user feel that the operation is cumbersome compared to a case where the user waves their hand a large number of times to cause the scrolling.

Further, the game device 20 moves the mark 40 on the scroll bar 38, to thereby allow the user to easily grasp how far the right hand P6 is to be moved before the scrolling is started and before the speed of the scrolling is changed.

Further, by causing the movement control unit 54 to perform the control in a case where the user holds out the right hand P6, it is possible to prevent such an erroneous operation that the scrolling starts in a case where the user who has no intention to cause the scrolling moves the right hand P6 in the left-right direction. Further, by restricting the control of the movement control unit 54 in a case where the user lowers the right hand P6, it is possible to easily instruct to lift the restriction of the scroll control.

Further, by setting different hands as the hand used for the scrolling and the hand for executing the processing corresponding to the menu item, it is possible to prevent the processing corresponding to the menu item from being erroneously executed during the scrolling.

(7. Modified Examples)

The present invention is not limited to the embodiment described above and modified examples to be described below. Various modifications may be made as appropriate without departing from the spirit of the present invention.

(1) For example, in the case where the user moves the right hand P6, due to the range of motion of joints, it is easy to move the right hand P6 rightward but is not easy to move the right hand P6 leftward. For this reason, the user may be allowed to start the scrolling or change the scrolling speed only by moving the right hand P6 leftward by a smaller amount than moving the right hand P6 rightward.

Figure 19:
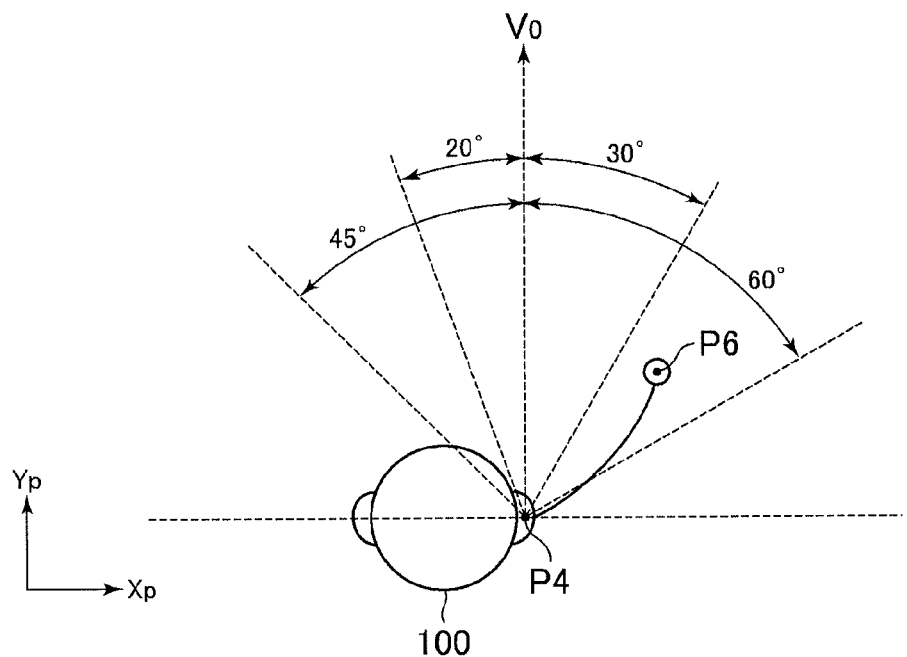
FIG. 19 is a diagram of the user viewed from above.

FIG. 19 is a diagram of the user viewed from above. As illustrated in FIG. 19, in a state in which the right hand P6 of the user is on the right side of the reference direction $V_0$, the scrolling of the item images 36 is restricted in a case where the angle $\theta_0$ is, for example, equal to or larger than 0° and smaller than 30°. Further, in this state, for example, the item images 36 move rightward at the first speed in a case where the angle $\theta_0$ is equal to or larger than 30° and smaller than 60°, and the item images 36 move rightward at the second speed in a case where the angle $\theta_0$ is equal to or larger than 60°.

On the other hand, in a state in which the right hand P6 of the user is on the left side of the reference direction $V_0$, the scrolling of the item images 36 is restricted in a case where the angle $\theta_0$ is, for example, equal to or larger than 0° and smaller than 20°. Further, in this state, for example, the item images 36 move leftward at the first speed in a case where the angle $\theta_0$ is equal to or larger than 20° and smaller than 45°, and the item images 36 move leftward at the second speed in a case where the angle $\theta_0$ is equal to or larger than 45°. In this manner, in Modified Example (1), the user does not need to move the right hand P6 leftward very far, which allows the item images 36 to scroll without having the user feel uncomfortable.

The movement restriction unit 56 according to Modified Example (1) includes: means for restricting the movement of the movement subject (item images 36) in a case where the position indicated by the position information falls on a forward direction side corresponding to the user's hand of the reference position or the reference direction with the numerical value being smaller than a first forward direction reference value; and means for restricting the movement of the movement subject in a case where the position indicated by the position information falls on a backward direction side opposite to the forward direction side of the reference position or the reference direction with the numerical value being smaller than a first backward direction reference value that is smaller than the first forward direction reference value.

The "forward direction side corresponding to the user's hand" represents a side on which the user's hand is placed, and is the right side for the right hand and the left side for the left hand. The "backward direction side opposite to the forward direction side" represents a side on which the user's hand is not placed, and is the left side for the right hand and the right side for the left hand. In the example of FIG. 19, the first forward direction reference value is 30° (first forward direction reference angle), and the first backward direction reference value is 20° (first backward direction reference angle). As the first forward direction reference value and the first backward direction reference value, predefined values may be used, or values that are changed based on settings made by the user may be used.

The first movement control unit 58 includes: means for moving the movement subject (item images 36) at the first speed in a case where the position indicated by the position information falls on the forward direction side of the reference position or the reference direction with the numerical value being equal to or larger than the first forward direction reference value and being smaller than a second forward direction reference value that is larger than the first forward direction reference value; and means for moving the movement subject at the first speed in a case where the position indicated by the position information falls on the backward direction side of the reference position or the reference direction with the numerical value being equal to or larger than the first backward direction reference value and being smaller than a second backward direction reference value that is smaller than the second forward direction reference value.

In the example of FIG. 19, the second forward direction reference value is 60° (second forward direction reference angle), and the second backward direction reference value is 45° (second backward direction reference angle). As the second forward direction reference value and the second backward direction reference value, predefined values may be used, or values that are changed based on settings made by the user may be used. Further, a difference between the second forward direction reference value and the first forward direction reference value, and a difference between the second backward direction reference value and the first backward direction reference value, may be arbitrarily set.

The second movement control unit 60 includes: means for moving the movement subject (item images 36) at the second speed in a case where the position indicated by the position information falls on the forward direction side of the reference position or the reference direction with the numerical value being equal to or larger than the second forward direction reference value; and means for moving the movement subject at the second speed in a case where the position indicated by the position information falls on the backward direction side of the reference position or the reference direction with the numerical value being equal to or larger than the second backward direction reference value.

According to Modified Example (1), it is possible for the user to execute the scroll control without moving their hand very far in a direction in which it is hard for the user to move their hand.

(2) Further, for example, a range in which the right hand P6 is to be moved may be adjusted depending on a size of the user's body.

The game device 20 according to Modified Example (2) includes means for acquiring information relating to the size of the user's body. The means is implemented mainly by the control unit 21. The information relating to the size of the user's body is acquired based on, for example, the photographed image obtained by photographing the user. In this case, the information relating to the size of the user's body is acquired by referring to an interval between the respective body parts of the user. As the information relating to the size of the body, the length of the arm or the user's height, which are calculated based on the positional relation between the respective body parts of the user, may be used.

Further, the game device 20 includes means for changing the first reference value and the second reference value based on the information relating to the size of the user's body. The means is implemented mainly by the control unit 21. Changes are made so that the first reference value and the second reference value become larger as the user's body becomes larger. For example, data obtained by associating the criterion relating to the size of the user's body with the first reference value and the second reference value may be stored in the data storage unit 52. The data may be in the form of a mathematical expression or may be in the form of a table. In this case, the information relating to the size of the user's body is compared with the above-mentioned criterion, and the first reference value and the second reference value associated with the satisfied criterion are used.

For example, in a case where the user's body is relatively small, the first reference angle $\theta_1$ may be set to 20°, and the second reference angle $\theta_2$ may be set to 40°. On the other hand, for example, in a case where the user's body is relatively large, the first reference angle $\theta_1$ may be set to 30°, and the second reference angle $\theta_2$ may be set to 60°.

According to Modified Example (2), the range in which the hand is to be moved can be changed depending on the size of the user's body.

(3) Further, for example, in the embodiment, the description is directed to the case of scrolling the item images 36, but the user may be allowed to select the menu item by moving the cursor image 42 based on the position of the right hand P6 of the user.

In Modified Example (3), the "movement subject" is the cursor image 42 moving on the item images 36 respectively indicating the plurality of menu items. The movement control unit 54 moves the cursor image 42 on the plurality of item images 36 displayed on the display screen (menu screen 30).

Figure 20:
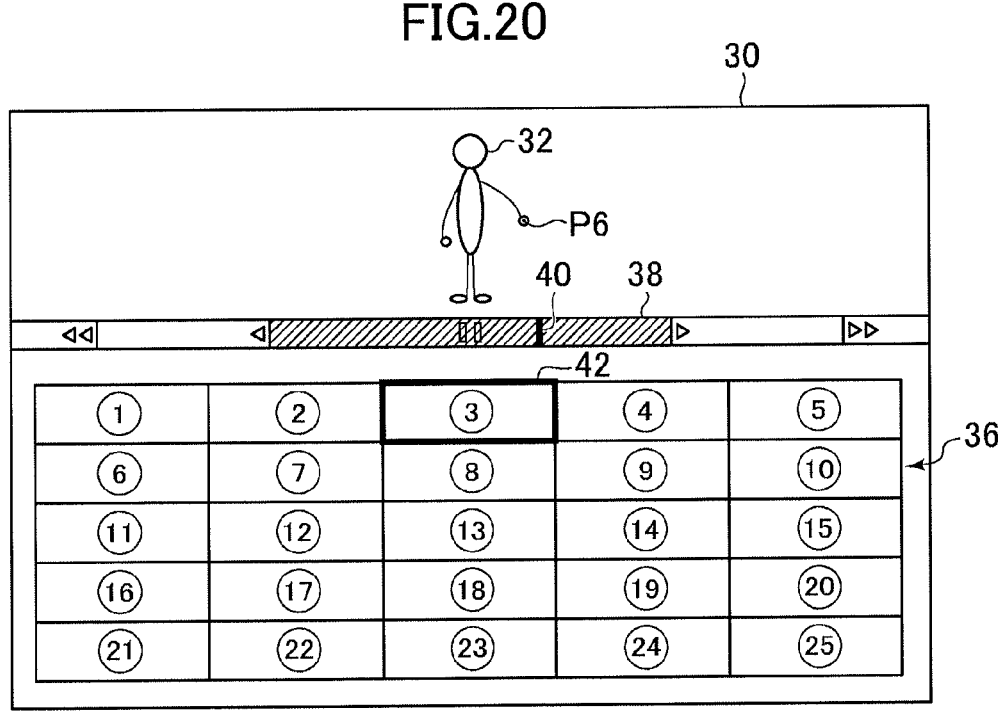
FIG. 20 is a diagram illustrating an example of the menu screen according to Modified Example (3)

FIG. 20 is a diagram illustrating an example of the menu screen 30 according to Modified Example (3). As illustrated in FIG. 20, in this case, 25 item images 36 are displayed on the menu screen 30. The cursor image 42 moves on those 25 item images 36. Information indicating the display position of the cursor image 42 is stored in the data storage unit 52. In a case where the cursor image 42 moves, the information indicating the display position of the cursor image 42 is updated. In the example of FIG. 20, in a case where the cursor image 42 moves to the item image 36 on one end, the cursor image 42 moves to the item image 36 in an upper row or a lower row on the other end.

A method of moving the cursor image 42 is the same as the method according to the embodiment, and the movement restriction unit 56 restricts the cursor image 42 so as not to move the cursor image 42 in a case where the angle $\theta_0$ is smaller than the first reference angle $\theta_1$. The first movement control unit 58 moves the cursor image 42 at the first speed in a case where the angle $\theta_0$ is equal to or larger than the first reference angle $\theta_1$ and smaller than the second reference angle $\theta_2$. The second movement control unit 60 moves the cursor image 42 at the second speed in a case where the angle $\theta_0$ is equal to or larger than the second reference angle $\theta_2$.

The processing execution unit 78 according to Modified Example (3) executes the processing corresponding to the menu item of the item image 36 indicated by the cursor image 42. The item image 36 indicated by the cursor image 42 represents the item image 36 displayed in the display position of the cursor image 42. For example, the processing corresponding to the menu item of the item image 36 indicated by the cursor image 42 is executed in a case where the user raises the left hand P5.

According to Modified Example (3), the cursor image 42 can be moved on the menu screen 30 based on the position of the right hand P6 of the user.

Note that a cursor image is not limited to the example of the embodiment. Any image that is used by the user to point at a portion within the screen may be used. Other examples of the cursor image include an image having such a shape of a mouse pointer and an icon image having a predetermined shape.

(4) Further, for example, in the embodiment, the description is given by taking the angle $\theta_0$ as an example of the numerical value related to the displacement between the position of the user's hand and the reference position or the reference direction, but the value used as the numerical value is not limited to the angle $\theta_0$. An index of the magnitude of the displacement between the position of the user's hand and the reference position or the reference direction may correspond to the "numerical value" according to the present invention.

(4-1) For example, a distance between the position of the user's hand and the reference position may be used as the numerical value indicating the displacement.

Figure 21:
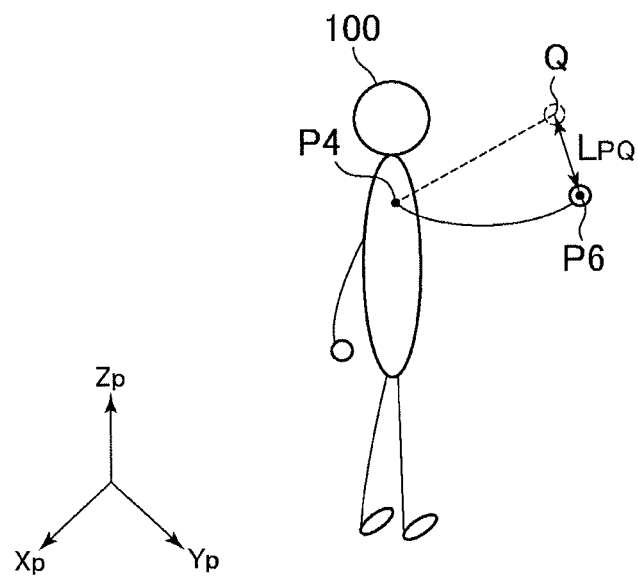
FIG. 21 is a perspective view of the real space.

FIG. 21 is a perspective view of the real space. As illustrated in FIG. 21, in this case, the position of the right hand P6 obtained in a case where the user holds out the right hand P6 frontward is set as a reference position Q. In this modified example, a distance $L_{PQ}$ between the current position of the right hand P6 and the reference position Q is used as the numerical value. The reference position Q may be set based on the position of the user. In addition, for example, the position of the right shoulder P4 or the back P7 may be used as the reference position Q.

In Modified Example (4-1), the position information is information relating to the position within the real space of the user's hand or the grasped object grasped by the user. In addition, the numerical value is a distance between the position indicated by the position information and the reference position set in the real space.

The movement restriction unit 56 according to this modified example restricts the movement of the movement subject (such as item image 36) in a case where the distance $L_{PQ}$ is smaller than a first reference distance. The first movement control unit 58 moves the movement subject (such as item image 36) at the first speed in a case where the distance $L_{PQ}$ is equal to or larger than the first reference distance and smaller than a second reference distance that is larger than the first reference distance. The second movement control unit 60 moves the movement subject at the second speed in a case where the distance $L_{PQ}$ is equal to or larger than the second reference distance.

The first reference distance and the second reference distance may be a predefined distance or may be changed depending on the size of the user's body. For example, the first reference distance and the second reference distance may be determined based on a distance between the right shoulder P4 and the right hand P6 of the user.

According to Modified Example (4-1), the scrolling of the item images 36 can be controlled based on the distance between the position of the user's hand and the reference position.

(4-2) Further, for example, a distance between the center point 38*d* of the scroll bar 38 and the display position of the mark 40 may be used as the numerical value indicating the displacement.

The position information according to Modified Example (4-2) is information relating to the position within the display screen or the virtual space corresponding to the position within the real space of the user's hand or the grasped object grasped by the user. The numerical value is a distance between the position indicated by the position information and the reference position set within the display screen or the virtual space. The position within the display screen or the virtual space corresponding to the position of the user's hand or the like is a position within the display screen or the virtual space obtained by substituting the position of the user's hand or the like within the real space into a given mathematical expression, for example, a display position of the mark 40. In this case, the distance d between the center point 38*d* of the scroll bar 38 and the display position of the mark 40 corresponds to the above-mentioned "distance".

The movement restriction unit 56 restricts the movement of the movement subject (such as item image 36) in a case where the distance d is equal to or larger than a first reference distance. The first movement control unit 58 moves the movement subject (such as item image 36) at the first speed in a case where the distance d is equal to or larger than the first reference distance and smaller than a second reference distance that is larger than the first reference distance. The second movement control unit 60 moves the movement subject at the second speed in a case where the distance d is equal to or larger than the second reference distance.

For example, in a case where the distance d is smaller than the distance $L_1/2$, that is, in a case where the mark 40 falls within the stop instruction region 38a, the scrolling of the item images 36 is restricted. In a case where the distance d is equal to or larger than the distance $L_1/2$ and smaller than the distance "$L_1/2+L_2$", that is, in a case where the mark 40 falls within the low speed instruction region 38b, the item images 36 move at the first speed. In a case where the distance d is equal to or larger than the distance "$L_1/2+L_2$", that is, in a case where the mark 40 falls within the high speed instruction region 38c, the item images 36 move at the second speed.

According to Modified Example (4-2), the scroll control can be performed based on the reference position and the position corresponding to the position of the user's hand within the display screen or the virtual space. Note that the case where the reference position is set within the display screen is described above, but in a case where the position information indicates a position within the virtual space, the reference position is set within the virtual space.

Further, in the case of Modified Example (4-2), the position information indicates the position within the display screen or the virtual space, and hence the first determination unit 68 and the second determination unit 72 include means for acquiring information relating to the position within the real space of the second hand of the user or the grasped object grasped by the user with the second hand. This information is included in the user body part information.

(5) Further, for example, the movement subject is not limited to the item image 36 or the cursor image 42. Any subject that moves within the display screen or the virtual space may be set as the movement subject.

(5-1) For example, a display subject region set within the virtual space may correspond to the movement subject.

Figure 22:
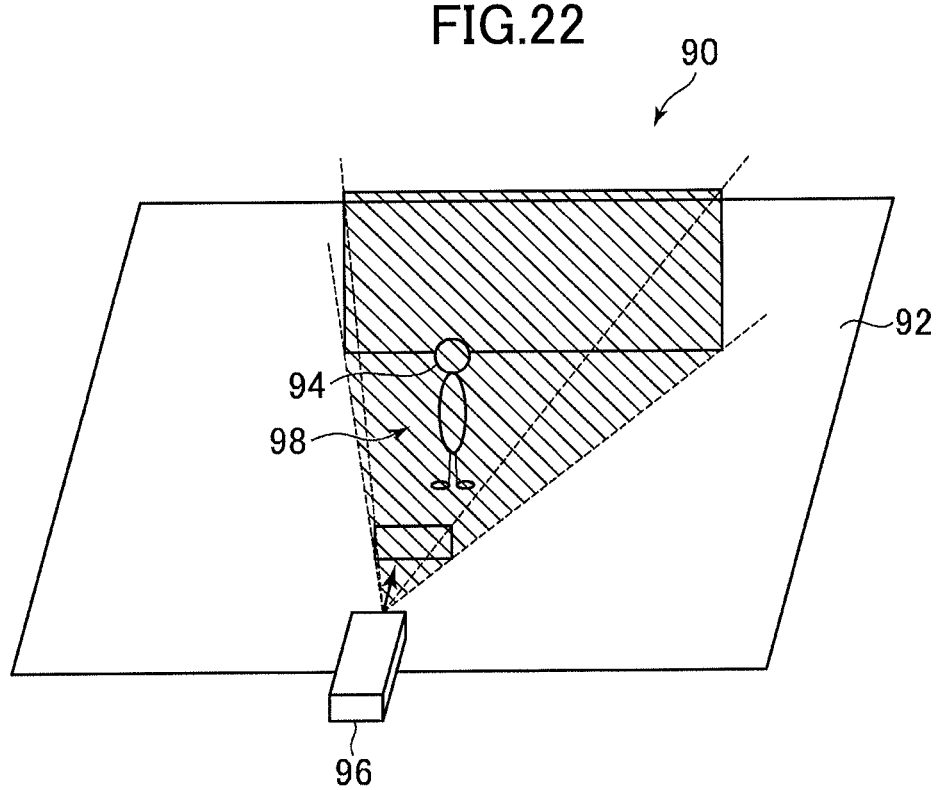
FIG. 22 is a diagram illustrating how a virtual space appears.

FIG. 22 is a diagram illustrating how the virtual space appears. As illustrated in FIG. 22, in this case, the description is given by taking a virtual three-dimensional space as an example, but a virtual two-dimensional space may be taken. For example, various objects such as a field 92, a character 94 indicating an operation subject of the user, and the like are located in a virtual space 90. The character 94 moves on the field 92 based on the user's operation. For example, the character 94 may move based on a change in the position of a predetermined body part of the user, or the character 94 may move based on an input signal received from the operation unit 26.

Further, a virtual camera 96 is set in the virtual space 90. A display subject region 98 is set based on the position of the virtual camera 96 and the line-of-sight direction. The display subject region 98 is a region (viewing frustum) indicating a field of view of the virtual camera 96, and an object within the display subject region 98 is displayed on the display screen. For example, vertex coordinates of the object within the display subject region 98 are subjected to the coordinate transformation, to thereby display a state of the virtual space 90 on the display screen.

The display subject region 98 may correspond to the "movement subject". That is, the movement subject according to Modified Example (5-1) is the display subject region 98 set within the virtual space 90. As described above, the state of an inside of the display subject region 98 within the virtual space 90 is displayed on the display screen. The movement control unit 54 restricts the movement of the display subject region 98, or moves the display subject region 98 at the first speed or the second speed. In a case where there is a change in the position of the virtual camera 96 or the line-of-sight direction, the display subject region 98 moves.

According to Modified Example (5-1), the display subject region 98 is allowed to move without having the user feel that the operation is cumbersome. Note that in a case where the display subject region moves in the two-dimensional space, by performing the same processing as the processing described referring to FIG. 14, the display subject region moves on a background image expressing the virtual space.

(5-2) Further, for example, the character 94 may correspond to the "movement subject".

The movement subject according to Modified Example (5-2) is the image that moves within the display screen or the operation subject of the user that moves within the virtual space. The movement control unit 54 restricts the movement of the character 94, or moves the display subject region 98 at the first speed or the second speed.

According to Modified Example (5-2), the operation subject of the user is allowed to move without having the user feel that an operation is cumbersome. Note that the operation subject is not limited to the character 94. Any subject that performs an action based on the user's operation may be set as the operation subject. In addition, for example, a moving object such as a tank or a ball may correspond to the operation subject.

(6) Further, for example, the first reference value and the second reference value are not limited to the numerical values stated in the embodiment and the modified examples, and may be larger or smaller than the numerical values described above. The first reference value and the second reference value may be any values that are previously designated or calculated based on a given mathematical expression.

In addition, the description is directed to the case where the angle $\theta_0$ and the distance $L_{PQ}$ are used as the numerical values, but the index of the magnitude of the displacement between the position of the user's hand or the like and the reference position or the like may be used as the numerical value, to which the value used as the numerical value is not limited. In addition, for example, the numerical value obtained by substituting the position of the user or the like and the reference position or the like into a given mathematical expression may be used.

Further, for example, in the embodiment and the modified examples, the description is directed to the case where the movement subject moves mainly in the horizontal direction, but any direction that is defined by a two-dimensional vector or a three-dimensional vector may be used as the moving direction of the movement subject, to which the moving direction is not limited. The movement subject may move in the vertical direction or move diagonally. In addition, in the case where the movement subject moves in the three-dimensional space, the movement subject may move back and forth.

Further, for example, in the embodiment and the modified examples, the description is directed to the case where the position information relates to the position of the user's hand, but the position information may relate to the position of the grasped object grasped by the user. The grasped object is a tangible object held by the user with the hand, for example, a game controller. In a method of acquiring the position of the grasped object, in the same manner as in the embodiment, the position may be acquired based on the photographed image and a depth image, or may be acquired only based on the photographed image.

In the case where the position of the grasped object is acquired based on the photographed image, the grasped object includes a photographing subject part having a given size. The photographing subject part is a part to be recognized which is used in image recognition processing, for example, a ball-shaped light-emitting portion provided to the game controller.

The position in the horizontal direction of the grasped object is identified based on the display position of the photographing subject part included in the photographed image, and the depth of the grasped object is identified based on a result of comparing the size of the photographing subject part within the photographed image with a reference size, to thereby identify the position of the grasped object within the real space.

In the case where the position information indicates the position or the like of the grasped object, the position of the grasped object at a given time point is used as the reference position and the user reference position. For example, in a case where the game controller corresponds to the grasped object, the reference position and the user reference position may be set based on the position of the grasped object placed in a case where the user depresses a given button on the game controller.

Further, in the embodiment and the modified examples, the description is directed to the case where the scroll control is performed based on the movement of the right hand P6 and processing for executing the menu item is performed based on the movement of the left hand P5, but the roles of the right hand P6 and the left hand P5 may be reversed. That is, the scroll control may be performed based on the movement of the left hand P5, and the processing for executing the menu item may be performed based on the movement of the right hand P6.

Further, for example, the description is given above by taking an example in which means for generating the position information based on the photographed image and the depth information (depth image) is included in the position detecting device 1, but the means for generating the position information may be included in the game device 20. For example, the game device 20 may receive the photographed image and the depth image from the position detecting device 1, and may generate the position information based thereon. Further, for example, the position detecting device 1 may be integrated with the game device 20, and the position detecting device 1 may be included in the game device 20.

Further, at least two of the above-mentioned embodiment and modified examples may be combined. In addition, in the embodiment, the description is directed to the case where the game device 20 includes the display control unit 62, the mark control unit 64, the first restriction unit 66, the first determination unit 68, the lifting unit 70, the second determination unit 72, the second restriction unit 74, the third determination unit 76, and the processing execution unit 78, but those components may not necessarily be included in the game device 20.

Further, the description is directed to the case where the movement control device according to the present invention is applied to the game device, but the movement control device according to the present invention can also be applied to various computers that perform processing for moving the movement subject within the display screen or the virtual space. In addition, for example, the present invention may be applied to a personal computer, a navigation system, a digital camera, and the like.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A movement control device, which moves a movement subject within one of a display screen and a virtual space, comprising:
   position information acquiring means for acquiring position information relating to one of: a position within a real space of one of a user's hand and a grasped object grasped by the user; and a position within one of the display screen and the virtual space corresponding to the position within the real space of the one of the user's hand and the grasped object grasped by the user; and
   movement control means for performing movement control on the movement subject based on the position information,
   wherein the movement control means comprises:
      movement restriction means for restricting a movement of the movement subject in a case where a numerical value indicating a magnitude of a displacement between a position indicated by the position information and one of a reference position and a reference direction is smaller than a first reference value;
      first movement control means for moving the movement subject at a first speed in one of a direction defined based on the position information and a predetermined direction in a case where the numerical value is equal to or larger than the first reference value and smaller than a second reference value that is larger than the first reference value; and
      second movement control means for moving the movement subject at a second speed that is faster than the first speed in the one of the direction defined based on the position information and the predetermined direction in a case where the numerical value is equal to or larger than the second reference value.

2. The movement control device according to claim 1, wherein:
   the movement subject moves in a predetermined moving direction within the one of the display screen and the virtual space;
   the movement control device further comprises:
      means for displaying a first image that extends in a direction corresponding to the predetermined moving direction and a second image that moves on the first image in an extending direction of the first image on the display screen; and
      second-image control means for moving the second image on the first image so that a positional relation between a representative point of the first image and a display position of the second image corresponds to a positional relation between the position indicated by the position information and the one of the reference position and the reference direction;
   the first image comprises:
      a first region that has a length corresponding to the first reference value and comprises the representative point;
      a second region that has a length corresponding to a difference between the second reference value and the first reference value and is adjacent to the first region; and
      a third region that has a predetermined length and is adjacent to a side opposite to a side on which the second region is adjacent to the first region; and the second-image control means is configured to:
move the second image on the first region in a case where restriction is performed by the movement restriction means;
move the second image move on the second region in a case where control is performed by the first movement control means; and
move the second image on the third region in a case where control is performed by the second movement control means.

3. The movement control device according to claim 1, wherein:
the movement restriction means comprises:
means for restricting the movement of the movement subject in a case where the position indicated by the position information falls on a forward direction side corresponding to the user's hand of the one of the reference position and the reference direction with the numerical value being smaller than a first forward direction reference value; and
means for restricting the movement of the movement subject in a case where the position indicated by the position information falls on a backward direction side opposite to the forward direction side of the one of the reference position and the reference direction with the numerical value being smaller than a first backward direction reference value that is smaller than the first forward direction reference value;
the first movement control means comprises:
means for moving the movement subject at the first speed in a case where the position indicated by the position information falls on the forward direction side of the one of the reference position and the reference direction with the numerical value being equal to or larger than the first forward direction reference value and being smaller than a second forward direction reference value that is larger than the first forward direction reference value; and
means for moving the movement subject at the first speed in a case where the position indicated by the position information falls on the backward direction side of the one of the reference position and the reference direction with the numerical value being equal to or larger than the first backward direction reference value and being smaller than a second backward direction reference value that is smaller than the second forward direction reference value; and
the second movement control means comprises:
means for moving the movement subject at the second speed in a case where the position indicated by the position information falls on the forward direction side of the one of the reference position and the reference direction with the numerical value being equal to or larger than the second forward direction reference value; and
means for moving the movement subject at the second speed in a case where the position indicated by the position information falls on the backward direction side of the one of the reference position and the reference direction with the numerical value being equal to or larger than the second backward direction reference value.

4. The movement control device according to claim 1, further comprising:
means for acquiring information relating to a size of a body of the user; and
means for changing the first reference value and the second reference value based on the information relating to the size of the body of the user.

5. The movement control device according to claim 1, further comprising:
means for restricting the movement control performed by the movement control means;
means for determining whether or not the user has held out their hand based on information relating to the position within the real space of the one of the user's hand and the grasped object grasped by the user; and
means for lifting restriction of the movement control performed by the movement control means in a case where it is determined that the user has held out their hand.

6. The movement control device according to claim 1, further comprising:
means for determining whether or not the user has lowered their hand based on information relating to the position within the real space of the one of the user's hand and the grasped object grasped by the user in a state in which the movement control is being performed by the movement control means; and
means for restricting the movement control performed by the movement control means in a case where it is determined that the user has lowered their hand.

7. The movement control device according to claim 1, wherein:
the position information comprises information relating to one of: a position within the real space of one of a first hand of the user and the grasped object grasped by the user with the first hand; and the position within the one of the display screen and the virtual space corresponding to the position within the real space of the one of the first hand of the user and the grasped object grasped by the user with the first hand;
the movement subject comprises a plurality of item images respectively indicating a plurality of menu items;
the movement control means moves the plurality of item images within the display screen; and
the movement control device further comprises:
means for acquiring information relating to a position within the real space of one of a second hand of the user and the grasped object grasped by the user with the second hand;
means for determining whether or not the one of the second hand of the user and the grasped object grasped with the second hand has performed a given action; and
means for executing processing corresponding to a corresponding one of the plurality of menu items of a corresponding one of the plurality of item images displayed in a predetermined position on the display screen in a case where it is determined that the one of the second hand of the user and the grasped object grasped with the second hand has performed the given action.

8. The movement control device according to claim 1, wherein:
the position information comprises information relating to one of: a position within the real space of one of a first hand of the user and the grasped object grasped by the user with the first hand; and the position within the one of the display screen and the virtual space corresponding to the position within the real space of the one of the first hand of the user and the grasped object grasped by the user with the first hand;

the movement subject comprises a cursor image that moves on a plurality of item images respectively indicating a plurality of menu items;

the movement control means moves the cursor image on the plurality of item images displayed on the display screen; and the movement control device further comprises:
   means for acquiring information relating to a position within the real space of one of a second hand of the user and the grasped object grasped by the user with the second hand;
   means for determining whether or not the one of the second hand of the user and the grasped object grasped with the second hand has performed a given action; and
   means for executing processing corresponding to a corresponding one of the plurality of menu items of a corresponding one of the plurality of item images indicated by the cursor image in a case where it is determined that the one of the second hand of the user and the grasped object grasped with the second hand has performed the given action.

9. The movement control device according to claim 1, wherein:
   the position information comprises information relating to the position within the real space of the one of the user's hand and the grasped object grasped by the user;
   the numerical value comprises an angle between a direction from a user reference position relating to a position of the body of the user toward the position indicated by the position information and the reference direction which is set in the real space;
   the movement restriction means restricts the movement of the movement subject in a case where the angle is smaller than a first reference angle;
   the first movement control means moves the movement subject at the first speed in a case where the angle is equal to or larger than the first reference angle and smaller than a second reference angle that is larger than the first reference angle; and
   the second movement control means moves the movement subject at the second speed in a case where the angle is equal to or larger than the second the reference angle.

10. The movement control device according to claim 1, wherein:
   the position information comprises information relating to the position within the real space of the one of the user's hand and the grasped object grasped by the user;
   the numerical value comprises a distance between the position indicated by the position information and the reference position which is set in the real space;
   the movement restriction means restricts the movement of the movement subject in a case where the distance is smaller than a first reference distance;
   the first movement control means moves the movement subject at the first speed in a case where the distance is equal to or larger than the first reference distance and smaller than a second reference distance that is larger than the first reference distance; and
   the second movement control means moves the movement subject at the second speed in a case where the distance is equal to or larger than the second the reference distance.

11. The movement control device according to claim 1, wherein:
   the position information comprises information relating to the position within the one of the display screen and the virtual space corresponding to the position within the real space of the one of the user's hand and the grasped object grasped by the user;
   the numerical value comprises a distance between the position indicated by the position information and the reference position which is set in the one of the display screen and the virtual space;
   the movement restriction means restricts the movement of the movement subject in a case where the distance is equal to or larger than a first reference distance;
   the first movement control means moves the movement subject at the first speed in a case where the distance is equal to or larger than the first reference distance and smaller than a second reference distance that is larger than the first reference distance; and
   the second movement control means moves the movement subject at the second speed in a case where the distance is equal to or larger than the second the reference distance.

12. The movement control device according to claim 1, wherein:
   the movement subject comprises a display subject region which is set within the virtual space;
   the display screen has a state of an inside of the display subject region within the virtual space displayed thereon;
   the movement restriction means restricts a movement of the display subject region in a case where the numerical value is smaller than the first reference value;
   the first movement control means moves the display subject region at the first speed in a case where the numerical value is equal to or larger than the first reference value and smaller than the second reference value; and
   the second movement control means moves the display subject region at the second speed in a case where the numerical value is equal to or larger than the second reference value.

13. The movement control device according to claim 1, wherein:
   the movement subject comprises one of an image that moves within the display screen and an operation subject of the user which moves within the virtual space;
   the movement restriction means restricts a movement of the one of the image and the operation subject in a case where the numerical value is smaller than the first reference value;
   the first movement control means moves the one of the image and the operation subject at the first speed in a case where the numerical value is equal to or larger than the first reference value and smaller than the second reference value; and
   the second movement control means moves the one of the image and the operation subject at the second speed in a case where the numerical value is equal to or larger than the second reference value.

14. A control method for a movement control device, which moves a movement subject within one of a display screen and a virtual space, the control method comprising:
   acquiring position information relating to one of: a position within a real space of one of a user's hand and a grasped object grasped by the user; and a position within one of the display screen and the virtual space corresponding to the position within the real space of the one of the user's hand and the grasped object grasped by the user; and
   performing movement control on the movement subject based on the position information,
   wherein the performing of movement control comprises:

a movement restriction step of restricting a movement of the movement subject in a case where a numerical value indicating a magnitude of a displacement between a position indicated by the position information and one of a reference position and a reference direction is smaller than a first reference value;

a first movement control step of moving the movement subject at a first speed in one of a direction defined based on the position information and a predetermined direction in a case where the numerical value is equal to or larger than the first reference value and smaller than a second reference value that is larger than the first reference value; and a second movement control step of moving the movement subject at a second speed that is faster than the first speed in the one of the direction defined based on the position information and the predetermined direction in a case where the numerical value is equal to or larger than the second reference value.

15. A computer-readable non-transitory information storage medium having a program recorded thereon, the program causing a computer to function as a movement control device, which moves a movement subject within one of a display screen and a virtual space, the program further causing the computer to function as:

position information acquiring means for acquiring position information relating to one of: a position within a real space of one of a user's hand and a grasped object grasped by the user; and a position within one of the display screen and the virtual space corresponding to the position within the real space of the one of the user's hand and the grasped object grasped by the user; and movement control means for performing movement control on the movement subject based on the position information, wherein the movement control means comprises:

movement restriction means for restricting a movement of the movement subject in a case where a numerical value indicating a magnitude of a displacement between a position indicated by the position information and one of a reference position and a reference direction is smaller than a first reference value;

first movement control means for moving the movement subject at a first speed in one of a direction defined based on the position information and a predetermined direction in a case where the numerical value is equal to or larger than the first reference value and smaller than a second reference value that is larger than the first reference value; and second movement control means for moving the movement subject at a second speed that is faster than the first speed in the one of the direction defined based on the position information and the predetermined direction in a case where the numerical value is equal to or larger than the second reference value.

* * * * *